United States Patent [19]
Nally

[11] Patent Number: 5,251,298
[45] Date of Patent: Oct. 5, 1993

[54] METHOD AND APPARATUS FOR AUXILIARY PIXEL COLOR MANAGEMENT USING MONOMAP ADDRESSES WHICH MAP TO COLOR PIXEL ADDRESSES

[75] Inventor: Robert M. Nally, Houston, Tex.

[73] Assignee: Compaq Computer Corp., Houston, Tex.

[21] Appl. No.: 661,076

[22] Filed: Feb. 25, 1991

[51] Int. Cl.$^5$ ............................................. G06F 15/00
[52] U.S. Cl. .................................. 395/166; 395/131; 395/164; 345/152; 345/203
[58] Field of Search ............................... 395/164-166, 395/131; 340/701, 703, 798, 799

[56] References Cited

U.S. PATENT DOCUMENTS

| | | | |
|---|---|---|---|
| 4,862,150 | 8/1989 | Katsura et al. | 395/160 |
| 4,985,848 | 1/1991 | Pfeiffer et al. | 395/164 |
| 5,095,301 | 3/1992 | Guttag et al. | 340/703 |

Primary Examiner—Robert L. Richardson
Assistant Examiner—Kee M. Tung
Attorney, Agent, or Firm—Pravel, Hewitt, Kimball & Krieger

[57] ABSTRACT

A pixel color processor that performs supplemental graphical processing duties in a video unit in a computer system. The pixel color processor is interfaced between a processor and video memory and performs pixel string manipulation and color management duties on the pixel color data at the direction of the processor, thereby freeing up the processor of these duties. The memory address space of the processor includes a monochrome memory area which maps onto the full-depth packed-pixel video memory. When the processor performs operations on this monochrome area, the pixel color processor intercepts the addresses data generated by the processor and performs the pixel block transfers.

19 Claims, 10 Drawing Sheets

METHOD AND APPARATUS FOR AUXILIARY PIXEL COLOR MANAGEMENT USING MONOMAP ADDRESSES WHICH MAP TO COLOR PIXEL ADDRESSES

BACKGROUND OF THE INVENTION

Field of the Invention

The present invention relates to graphics processing in computer systems, and more specifically to a pixel color processor that supplements a graphics processor in a computer system by performing pixel string manipulation and color management duties.

Description of the Related Art

The computer industry is a vibrant and growing field that continues to evolve as new innovations occur. A major factor in the growth of the personal computer industry is the increasing number of graphics based applications that are being developed. This is evidenced by the growth of graphics-related software applications such as computer aided design (CAD), graphical user interfaces (GUI), audio-visual and multi-media displays, business graphics applications such as pie charts and 2 or 3-dimensional graphs, 3-D imaging, image processing, and other types of graphics-intensive software such as computer video games. For these reasons, graphical processing has become an important research area in personal computer design.

The video section of a computer system is controlled by circuitry referred to as the video unit. The video capabilities of the video unit can generally be separated into two video modes, text mode and graphics mode. In text mode the display screen is divided up into specific character positions and can only show the computer's basic character set. In graphics mode, the computer screen is treated as a two dimensional array of tiny dots called pixels (picture elements), and images are formed on the screen by building up a drawing made up of these pixels. The number of pixels that can be displayed on the screen at one time is called the resolution.

Another dimension to the video capabilities of personal computer systems is color. In graphics mode, each pixel has associated with it a certain number n of bits that represent the $2^n$ various possibilities of color that the pixel may have. For example, if each pixel had associated with it two bits of color information, then there would be 4 possible colors that the pixel could have.

The computer's video monitor or video screen works in a manner similar to that of a television set with a scheme known as raster scan. In this scheme, the video screen is comprised of a number of horizontal scan lines, and a moving electron beam paints an image by continuously tracing a path through these horizontal scan lines. As the electron beam scans over the screen, the video unit continuously reads out data from the video memory and translates the data bits into signals that control the electron beam.

The video units that have been developed for personal computer systems all have certain elements in common. These elements generally include video memory, host interface circuitry, a graphics controller, and video output circuitry. In many video units, the microprocessor is responsible for the operation of the video unit, transferring the data into and out of the video memory which appears on the screen. However, some video units also include a graphics processor to remove some of the work load from the CPU. A graphics processor accelerates graphics processing by performing logical manipulations locally on video pixel data.

One of the greatest limitations on video unit performance is the size of the data bus used to transfer video data. Large amounts of data can be transferred more efficiently on a computer with a wide data bus than one with a smaller data bus. In general, the data bus width of the microprocessor dictates the internal data bus width of the computer system. A wider data path allows more data to be transferred in a single operation, thereby providing more data throughput. In the personal computer industry, there has been an increasing trend toward microprocessors with increased data bus width. For example, in the Intel Corp. (Intel) 8086 family of microprocessors, the data bus width of the processor has evolved from 8 bits in the original 8086 processor to a 32-bit data bus in the 80386 and 80486 processors.

However, even though the microprocessor dictates the data bus width size, generally only a portion of the data bus is provided to peripherals in personal computer systems. This is the case with many video units used in personal computer systems. For example, in computers previously manufactured and sold by International Business Machine Corporation (IBM), the video unit is generally only provided with an 8 or 16-bit data bus for data transfer. Because of this, many video units are designed to utilize only an 8 or 16-bit data bus for data transfer. An 8 or 16-bit data bus has generally been found to be too limiting for the large amounts of data transfer necessary in modern graphics processing.

Graphics processing in a computer system generally involves a large amount of data, and hence a large amount of display memory. For example, a standard video mode with a pixel array of 640×480 would have over 307,000 pixels. In a 4 bits per pixel mode where each pixel had associated with it 4 bits of color information, approximately 150 kbytes of memory would be necessary simply to produce an image on the screen. Additionally, most video units require a larger amount of video memory than that simply required to produce an image on the screen. One reason is that many video units utilize a method called logical windowing, which requires that video display memory store more information than can be displayed at one time on the monitor. Logical windowing allows data that is displayed on the screen to have an arbitrary starting address in screen memory other than the default offset of 0. In this way, changing the starting address of the screen in row increments allows the screen to be effectively scrolled without the inefficiency of having to copy blocks of data to and from the screen memory. This eliminates the undesirable visual effects of "jump" scrolling and provides a more pleasing display. In addition, many applications utilize windowing or menu techniques which require that the display data underneath a window or pull-down menu be saved so that the original screen can be restored once the window or pull-down menu is removed. The video memory used to hold video data that is not presently on the screen is generally referred to as off-screen memory.

In addition to the large amounts of data required, graphical applications for computer systems also generally involve large amounts of data manipulation that must be done very quickly. For example, windowing and pull-down menu applications require that images be added or removed from the screen instantly. Many computer-aided design (CAD) and three-dimensional modeling applications include zooming and panning techniques that can be used to view images in high resolutions. Video units need a significant amount of speed and data throughput to properly handle these techniques because they require that the image be redrawn frequently. The development of computer video animation software has multiplied these data throughput problems considerably. Compounding these data throughput problems is the increasing user demand for video displays with greater resolution. As video display resolution increases, the corresponding amount of data manipulation required to service this new pixel data multiplies. In addition, user demand for increased numbers of colors on the monitor require a larger number of bits per pixel, further increasing the amount of data manipulation necessary.

Video units have therefore been called on to manipulate increasing amounts of data at greater speeds. This has resulted in problems because many new software applications are pushing the performance limits of most video units. Therefore, it is desirable to enhance the speed of video units and increase their data throughputs so that they can more efficiently manipulate the large quantities of data that these new software applications require.

SUMMARY OF THE INVENTION

The present invention comprises a pixel color processor that supplements a graphics processor or microprocessor in a computer system by performing the duty of pixel color management in pixel block transfers and color expand and fill operations, thereby allowing the graphics processor or microprocessor, hereafter referred to as graphics processor, to divorce itself of this responsibility. By using the services of the pixel color processor, the graphics processor can manipulate bits of data which correspond to pixel strings or pixel patterns. The graphics processor is thus able to operate on pixels in more generalized terms, thereby allowing it to process more pixels per operational cycle. The pixel color processor includes a pipelined structure and a 32-bit pixel data bus for increased speed and data throughput.

The pixel color processor according to the present invention is interfaced between the graphics processor and video memory and works very closely with the graphics processor. The pixel color processor is connected to the graphics processor through the processor's data bus, and is connected to video memory by a 32-bit block transfer data bus, thus allowing for high data bandwidth. The logical memory address space of the graphics processor includes two monochrome or one bit per pixel memory areas which map to the video memory area where color pixel data and pixel patterns are actually located. Read and write memory accesses to these monochrome or monomap areas by the graphics processor initiate specific operations by the pixel color processor.

The pixel color processor responds to the activity of the graphics processor when the graphics processor desires to use the services provided by the pixel color processor. When the graphics processor wishes to move a string of pixels or perform a color expand or fill operation using the services of the pixel color processor, it enters a one bit per pixel mode and sets appropriate bits in a control register. The graphics processsor then performs a block transfer or color expand/fill instruction, placing the monomap addresses corresponding to the addresses of the requested pixels onto the address bus.

The pixel color processor intercepts these monomap addresses and generates the correct video memory addresses where the desired data is actually located in video memory. The pixel color processor uses these newly generated addresses to load its own buffer, referred to as the source array buffer, with the appropriate data from the video memory. If the graphics processor is performing a pixel block transfer operation, the data held in the video memory is pixel color data that is preferably in a bit per pixel format, preferably a 4 or 8 bit per pixel format according to the present embodiment. If the graphics processor is performing a color expand or fill operation, then the data input to the source array typically represents a pixel fill pattern. The source array buffer is organized as a double buffered first in first out (FIFO) to provide pipelining to the pixel data transfers.

The graphics processor of the preferred embodiment has a 16 bit data bus and therefore expects 16 bits of data to be returned from video memory in response to its read cycles. The pixel color processor may optionally place a value, preferably hex value FFFFh according to the present embodiment, onto the graphics processor's data bus in response to the graphics processor's monomap memory read, thereby fooling the graphics processor into thinking that it has received all ones back from its monomap memory read operation. The graphics processor operates on this data to form a respective one bit per pixel image that it wishes to display onto the screen. The graphics processor then performs a write operation to monomap addresses corresponding to the desired video memory location where the actual color pixel data is to be written to the video memory.

The pixel color processor receives the monomap addresses and generates the corresponding video memory addresses where the color pixel data is to be written in video memory. The pixel color processor also intercepts the one bit per pixel data output from the graphics processor write operation and uses this data as a write mask to determine which bytes of data in the source array should be written to video memory. The pixel color processor includes logic which controls the output of data from the source array buffer.

During pixel block transfers, the pixel data is written through output latches to the appropriate destination in video memory on the 32 bit pixel data bus. If the graphics processor is performing a color expand or fill operation, the pattern data is output from the source array to video random access memory (VRAM) which preferably includes special block write or color expand features. Color registers associated with the VRAM expand color data onto each of the bits in the pixel pattern received from the source array, and the newly formed color pixel data is then stored in video memory.

The graphics processor may also initiate a color expand or fill operation without using the services of the pixel color processor. According to this method, the graphics processor performs a write operation to an area in the monomap region corresponding to the desired video memory addresses where the pixel data is to be placed. The graphics processor generates pattern data that is provided to the VRAM during this write. The VRAM uses its color expand features and its color registers to expand color data onto the pixel pattern and then stores the resulting color pixel data in video memory.

In an alternate embodiment of the invention, the VRAM does not include color expand features, and logic associated with the pixel color processor mimics the color expand features of the VP. In this embodiment, the pattern data generated by the graphics processor is provided directly to this logic, which expands the appropriate color data onto the pattern and then provides the newly formed color pixel data to the VRAM.

In yet another embodiment of the invention, the pixel font or pattern data is temporarily stored in the source array, and the pixel color processor includes its own color registers which are used to expand color data onto pixel patterns stored in the source array. The pixel color processor according to this embodiment also includes extra output latches to hold the newly formed color pixel data before it is output to video memory. Extra output latches are required because 8 bits of color data are expanded on the pixel pattern stored in the source array before this data is provided to the output latches.

In all of these instances, when the graphics processor writes the one bit pixel data back to the appropriate monomap memory addresses, it can then turn to other tasks. Meanwhile, the pixel color processor performs the data intensive task of transferring the color pixel data or pattern data to video memory using its 32 bit pixel data bus. Therefore, the graphics processor can manipulate pixel data in more generalized terms, thereby reducing the amount of data manipulation required by the graphics processor and allowing it to operate on more pixels per operational cycle.

When the graphics processor is using the services of the pixel color processor and the source array according to the first embodiment to perform color expand or fill operations using the color expand features of the VRAM's, each monomap bit manipulated by the graphics processor corresponds to eight pixels. Thus the graphics processor can only manipulate blocks of eight pixels and therefore has lost the ability to address individual pixels. The graphics processor is therefore unable to align or adjust the boundary of an image except on eight pixel boundaries. Therefore, an alternate embodiment of the present invention includes logic which enables the graphics processor to mask individual pixels on the left and right sides of an image, thereby allowing the graphics processor to perform individual pixel boundary adjustments. This logic includes two 8 bit registers which hold a write mask for the first and last eight bits of an image. The register mask values are coupled to the data values output from the source array in such a way as to allow these registers to mask the first and last eight bits of an image for each respective scan line. This enables the graphics processor to perform individual pixel boundary adjustments during color expand and fill operations while using the services of the pixel color processor.

BRIEF DESCRIPTION OF THE DRAWINGS

A better understanding of the invention can be obtained when the following detailed description of the preferred embodiment is considered in conjunction with the following drawings, in which.

DESCRIPTION OF THE PREFERRED EMBODIMENTS

Figure 1:
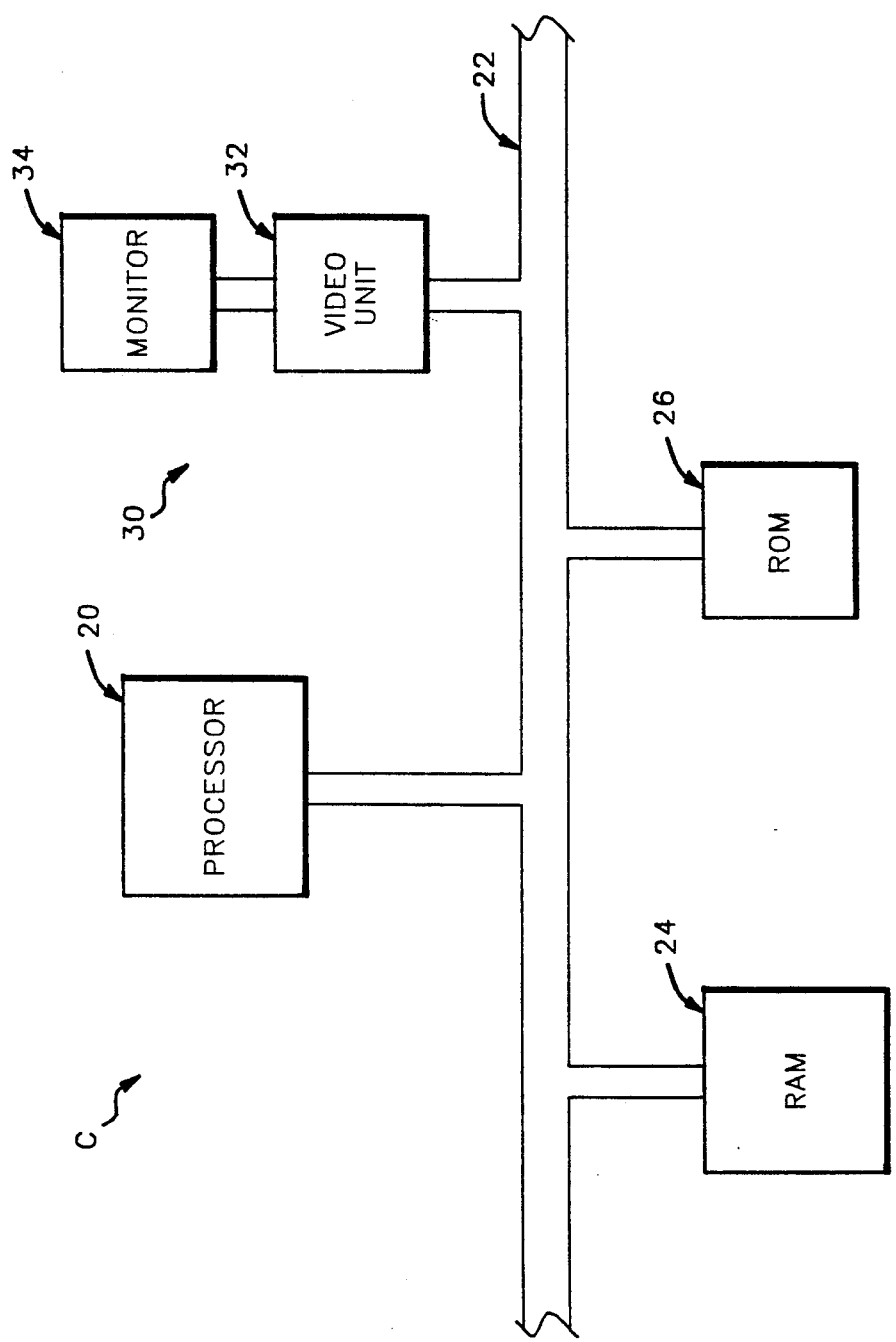
FIG. 1 is a block diagram of a computer system incorporating the present invention.

Referring now to FIG. 1, the letter C designates generally a computer system incorporating the present invention. Many of the details of a computer system that are not relevant to the present invention have been omitted for the purpose of clarity. The computer system C includes a microprocessor 20 coupled to a system bus 22. The system bus 22 includes an address bus, a data bus, and a control bus and is preferably based on the Industry Standard Architecture, a bus architecture introduced in the International Business Machines (IBM) PC/AT personal computer. Random access memory 24 and read only memory 26 are also preferably coupled to the system bus 22. A video section 30 comprising a video unit 32 and a video monitor 34 is coupled to the system bus 22. The video unit 32 is coupled between the system bus 22 and the video monitor 34 and includes a pixel color processor according to the present invention.

Figure 2:
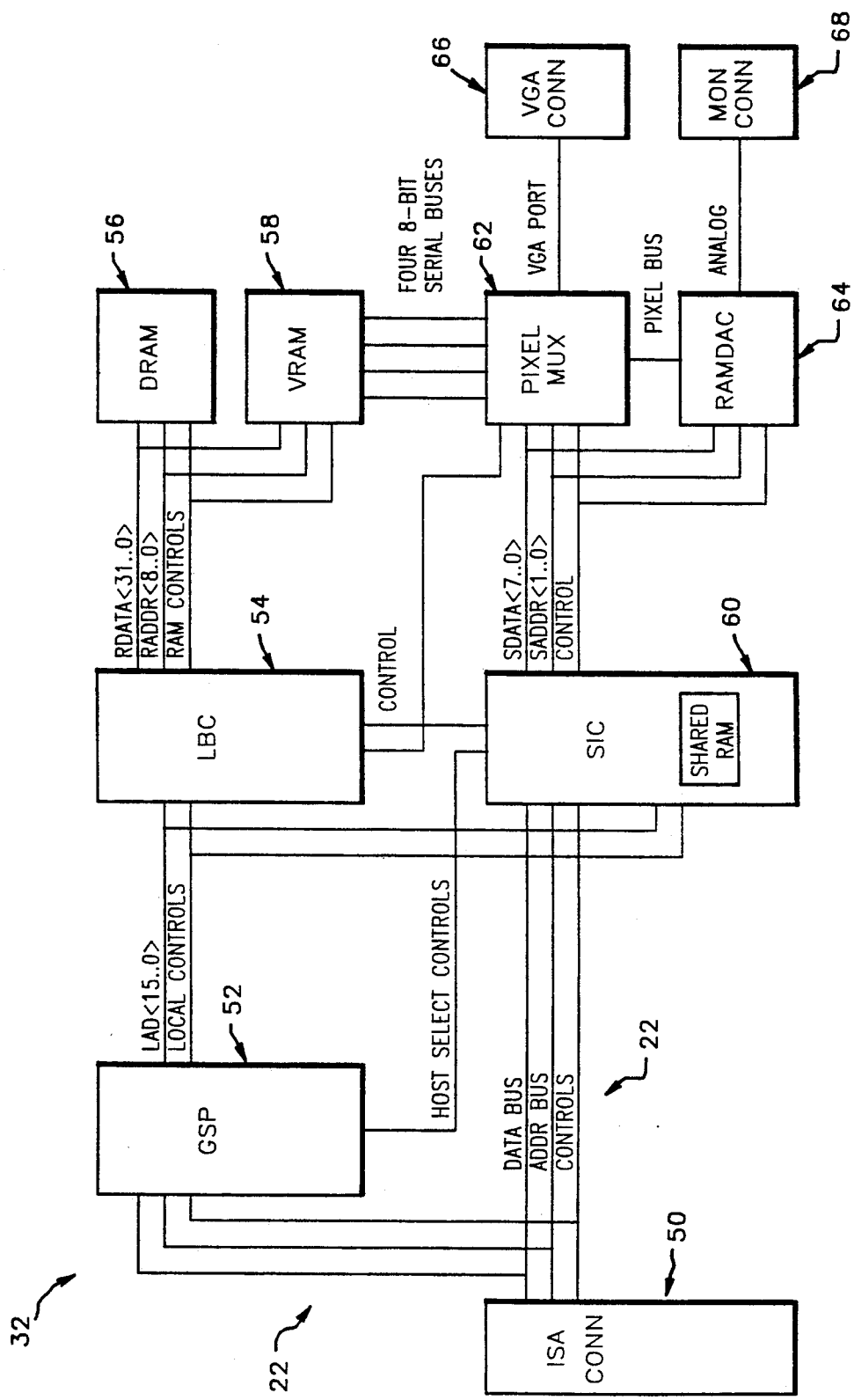
FIG. 2 is a block diagram of the video unit of FIG. 1.

Referring now to FIG. 2, the video unit 32 is generally shown. The video unit 32 includes an ISA connector 50 which connects to the ISA system bus 22. In the present embodiment, the video unit 32 includes a graphics processor referred to as the graphics signal processor or GSP 52. The GSP 52 takes some of the work load off of the microprocessor 20, thereby speeding up graphics and overall system performance. In an alternate embodiment of the present invention, the video unit 32 does not include a graphics processor, and the microprocessor 20 performs all of the graphics processing duties. The GSP 52 is preferably a Texas Instruments (TI) 34010 graphics processor according to the preferred embodiment, but the use of other graphics processors is also contemplated. The GSP 52 is connected to the system data bus, address bus, and control bus through the ISA connector 50. The GSP 52 includes a local address and data bus that is multiplexed onto 16 lines referred to as LAD<15..0>. The GSP 52 multiplexes a low word and high word of a 32 bit address onto the LAD<15:0> bus to achieve a 32 bit addressing capability. The GSP 52 also includes a local control bus referred to as Local Controls.

Figure 3:
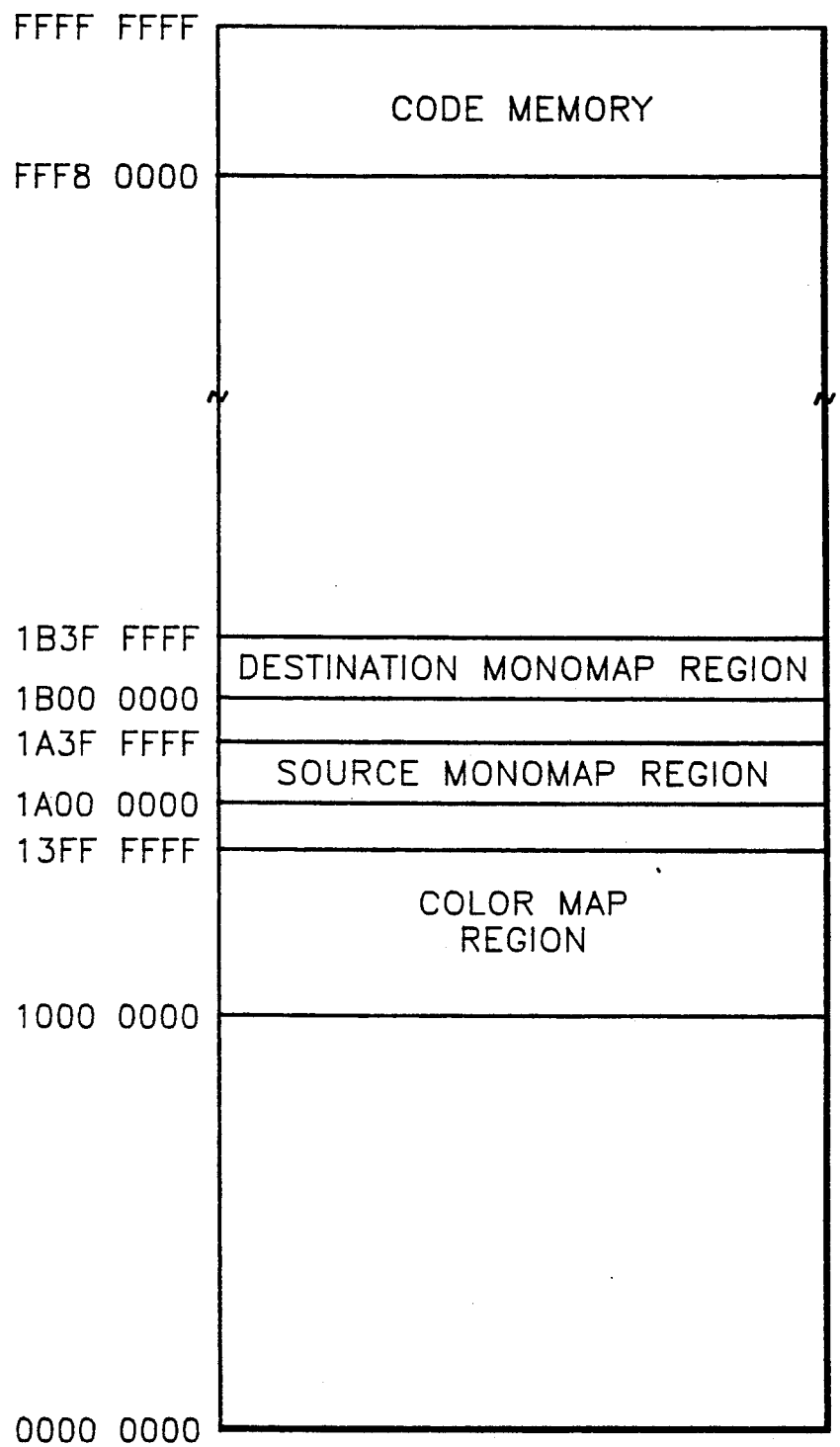
FIG. 3 illustrates the memory map of the graphics signal processor (GSP) of FIG. 2.

Referring now to FIG. 3, a memory map illustrating the address space allocation of the GSP 52 is shown. The 34010 graphics processor used in the preferred embodiment is a bit addressable processor wherein each address corresponds to a single bit of data. The GSP address space includes a memory region referred to as CODE memory which is located between memory address FF80 0000 and FFFF FFFF and is reserved for program storage. The GSP address space also includes an address region reserved for on-screen and off-screen memory referred to collectively as the color map region. The color map region is preferably located between memory address 1000 0000 and 13FF FFFF and therefore can accommodate up to 64 Mbits (8 Mbytes) of pixel data. The color map region preferably holds both color pixel data and pixel pattern data. The GSP address space also includes memory address space reserved for two monomap regions referred to as the source and destination monomap regions. The source monomap region preferably resides between memory address 1A00 0000 and 1A3F FFFF, and the destination monomap region preferably resides between memory address 1B00 0000 and memory address 1B3F FFFF. If pixel color data is stored in an 8 bit per pixel mode in the color map region, then each address in the respective monomap regions maps or corresponds to eight addresses in the color map region. Alternatively, if pixel color data is stored in a 4 bit per pixel mode in the color map region, then each address in the respective monomap regions maps to four addresses in the color map region.

Referring again to FIG. 2, a block circuit referred to as the local bus controller or LBC 54 is connected to the LAD<15..0> lines and the Local Controls bus of the GSP 52. The LBC 54 is connected to a 32 bit color pixel data bus referred to as RDATA<31..0>, a 9 bit address bus referred to as RADDR<8..0>, and a control bus referred to as RAM Controls. Off-screen memory referred to as DRAM 56 and on-screen video memory referred to as VRAM 58 are coupled to the RDATA<31..0> bus, the RADDR<8..0> bus, and the RAM Controls bus. In the present embodiment, 1 Mbyte of on-screen memory or VPU 58 and 512 kbytes of off-screen memory or DRAM 56 are included in the video unit 32, but the use of greater amounts of memory is also contemplated. In addition, the VRAM 58 may be used to store off-screen memory. The DRAM 56 and VRAM 58 are preferably mapped to portions of the color map and monomap regions in the GSP's address space. The portions of the DRAM 56 and VRAM 58 that are mapped to the color map region comprise either pixel color data in a 4 or 8 bits per pixel mode or pixel pattern data.

The LBC 54 supports page mode operations, generating the multiplexed addresses, row and column address strobes, write strobes, and output enables required for these cycles. The LBC 54 also passes the LAD<15:0> bus from the GSP 52 through to the DRAM 56 and VRAM 58 on the upper or lower half of the RDATA<31:0> data bus, depending on the color map address generated, to enable the GSP 52 to directly access the DRAM 56 and VRAM 58. The LBC 54 also includes address decode circuitry which determines whether addresses generated by the GSP 52 reside in either of the monomap regions.

The LBC 54 includes a pixel color processor (FIG. 4) according to the present invention. The pixel color processor is a companion device to the GSP 52 which allows for enhanced performance of color expand, fill and screen to screen block transfer functions. If the video unit 32 does not include a graphics processor, then the pixel color processor works in conjunction with the microprocessor 20. The GSP 52 takes advantage of the services provided by the pixel color processor in the LBC 54, which increases the performance of the GSP 52 in doing color expand, fill, and block transfer functions.

A block circuit referred to as the system interface controller (SIC) 60 is coupled to the LBC 54 by a control bus. The SIC 60 is coupled to the GSP 52 through the LAD<15..0> bus and the Local Controls bus. The SIC 60 is further coupled to the GSP 52 through a bus referred to as Host Select Controls. The SIC 60 is also coupled to the system data bus, address bus, and control bus from the ISA connector 50. The SIC 60 is coupled to a pixel multiplexer 62 through a data bus referred to as SDATA<7..0>, an address bus referred to as SADDR<1..0>, and a control bus. The SIC 60 includes RAM which is shared between the CPU 20 and the GSP 52 which is used to pass control information between the CPU 20 and the GSP 52. The SIC 60 acts as an interface between the ISA bus 22 and the remainder of the video unit 32.

The VRAM 58 is coupled to the pixel multiplexer 62 via four 8 bit serial buses. The pixel multiplexer 62 also receives input through a VGA (video graphics array) port from a VGA connector 66, which preferably receives video pass-through data from a VGA card (not shown). This enables the video unit 32 to receive video pixel data from a VGA card in addition to the pixel data located in the VRAM 58. The LBC 54 is also coupled to the pixel multiplexer 62. The pixel multiplexer 62 multiplexes between pixel data provided from either the VRAM 58 or the VGA card. The output of the pixel multiplexer 62 is provided to a random access memory digital to analog converter (RAMDAC) 64 through a bus referred to as pixel bus. The RAMDAC 64 is coupled to the SDATA<7..0> bus, the SADDR<1..0> bus, and the control bus of the SIC 60. The RAMDAC 64 generates analog signals that are provided to a monitor connection 68 to which the video monitor 34 is connected.

The color pixel data in the color map region may be in any bit per pixel mode, but is preferably in an 8 bit per pixel mode according to the present embodiment. The number of bits per pixel is selected by the value of a bit in a control register located in the LBC 54. As mentioned above, the color map region preferably includes font or pattern data that is used in color expand and fill operations. The color map region in video memory may be accessed directly by the GSP 52 16 bits at a time as is normally accessed by the GSP 52. The GSP 52 directly accesses color pixel data or pattern data from video memory through its LAD<15:0> data/address bus, which is passed through the LBC 54 to the DRAM 56 and VRAM 58 through the lower or upper 16 bits of the RDATA<31:0> data bus.

The GSP 52 may also initiate efficient pixel block transfers and color expand and fill operations using the services of the pixel color processor in the LBC 54 through memory accesses to the monomap memory regions according to the present invention. When the GSP 52 wishes to use the services of the pixel color processor, it first sets a bit referred to as the monomap bit in the LBC 54. The GSP 52 then sets or clears a bit in the LBC 54 referred to as the block transfer bit. When the block transfer bit is set, the GSP 52 is performing a block transfer instruction. When the block transfer bit is cleared, the GSP 52 is performing a color expand or fill operation using special block write or color expand features of the VRAM 58, as is explained below. When the block transfer bit is cleared, the GSP 52 also preferably sets or clears a bit referred to as the source array bit, which indicates whether or not a memory buffer in the pixel color processor referred to as the source array is used. Until noted otherwise, in the following discussion the source array bit is assumed to be set, indicating that the pixel color processor is engaged when the block transfer bit is cleared and the GSP 52 performs a color expand or fill instruction.

When the GSP 52 performs a read or write operation to an area of the source or destination monomap region, respectively, the operation of the pixel color processor is engaged. A GSP write operation to the source monomap has no effect, and a GSP read of the destination monomap preferably returns a data value of "0000" to the GSP 52 without actually accessing the video memory. The address decode logic in the LBC 54 determines when these monomap regions are accessed by the GSP 52 and enables the operation of the pixel color processor. Because this type of address decode logic is well known to those skilled in the art, details of its implementation is omitted for the purpose of simplicity.

When the block transfer bit is set and the GSP 52 begins a pixel block transfer instruction, it accesses respective addresses in the monomap region which correspond to addresses in the color map region where 8 bit color pixels reside. The pixel block transfer instruction engages the pixel color processor to manipulate the pixel color data in the color map region, as is explained below. When the block transfer bit is cleared and the GSP 52 begins a color expand or fill instruction, it accesses respective addresses in the monomap region which correspond to addresses in the color map region where pixel pattern data is located. When the source array bit is set, the color expand or fill instruction engages the pixel color processor to manipulate pattern data, as is described below. The operation of the pixel color processor is the same regardless of whether the GSP 52 is performing a pixel block transfer operation or a color expand or fill operation.

The VRAM 58 preferably includes special block write or color expand features according to the present embodiment. The VRAM 58 can accept pattern data in addition to color pixel data. When the block transfer bit is set and the VRAM 58 receives color pixel data from the pixel color processor, it receives the appropriate pixel addresses and stores this data as would normally be done. When the block transfer bit is cleared and pattern data is being provided to the VRAM 58, the LBC 54 generates a signal referred to as the color expand signal which directs the VRAM 58 to use its block write or color expand features. When the color expand signal is asserted, the VRAM 58 ignores the least 2 significant bits in the addresses it receives and replaces these bits with write enable signals formed from the pixel pattern received by the VRAM 58. The write enable signals determine which locations are written. It should be noted that each bit in the pixel pattern ultimately corresponds to an 8 bit pixel in video memory after the color expand features of the VRAM 58 are used to expand color data on each of the bits in the pattern. Therefore, during color expand and fill operations, each bit in the monomap region corresponds ultimately to eight 8 bit pixels in the present embodiment.

The VRAM 58 preferably includes one 32-bit color register (not shown) which holds color pixel data for monochrome pixel expansion. The VRAM 58 uses the pattern data it receives from the GSP 52 and expands the color pixel data in its color register onto these bits depending on whether the respective pattern bit is a 1 or 0. The VRAM color register is preferably partitioned into two halves referred to as COLORREG0 and COLORREG1. This is because the GSP 52 includes only a 16 bit data bus, whereas the VRAM 58 includes a 32 bit data bus, and therefore COLORREG0 corresponds to one half of the RDATA<31:0> bus and COLORREG1 corresponds to the other half of the RDATA<31:0> bus. During color expand operations, the VRAM 58 preferably expands the color data in COLORREG0 and COLORREG1 onto the respective pattern bit if the bit is 1. If the bit is 0, the color map data is not modified. To expand two different colors on the pattern bits depending on whether the bits are 1 or 0, two expands or fills are needed. Firstly, the color data in COLORREG0 and COLORREG1 is expanded on the 1's in the pixel pattern. The pattern is then inverted and the color register values changed. The new color values in COLORREG0 and COLORREG1 are then expanded onto the 1's in the pattern, which are the inverted 0's from the first expand. The color expand and fill operations that can be performed by the VRAM 58 considerably reduce the number of write operations that are necessary to store data into memory because every pattern data bit in the data transfer to the VRAM 58 corresponds to a pixel having a plurality of bits that is ultimately stored in video memory.

Figure 4:
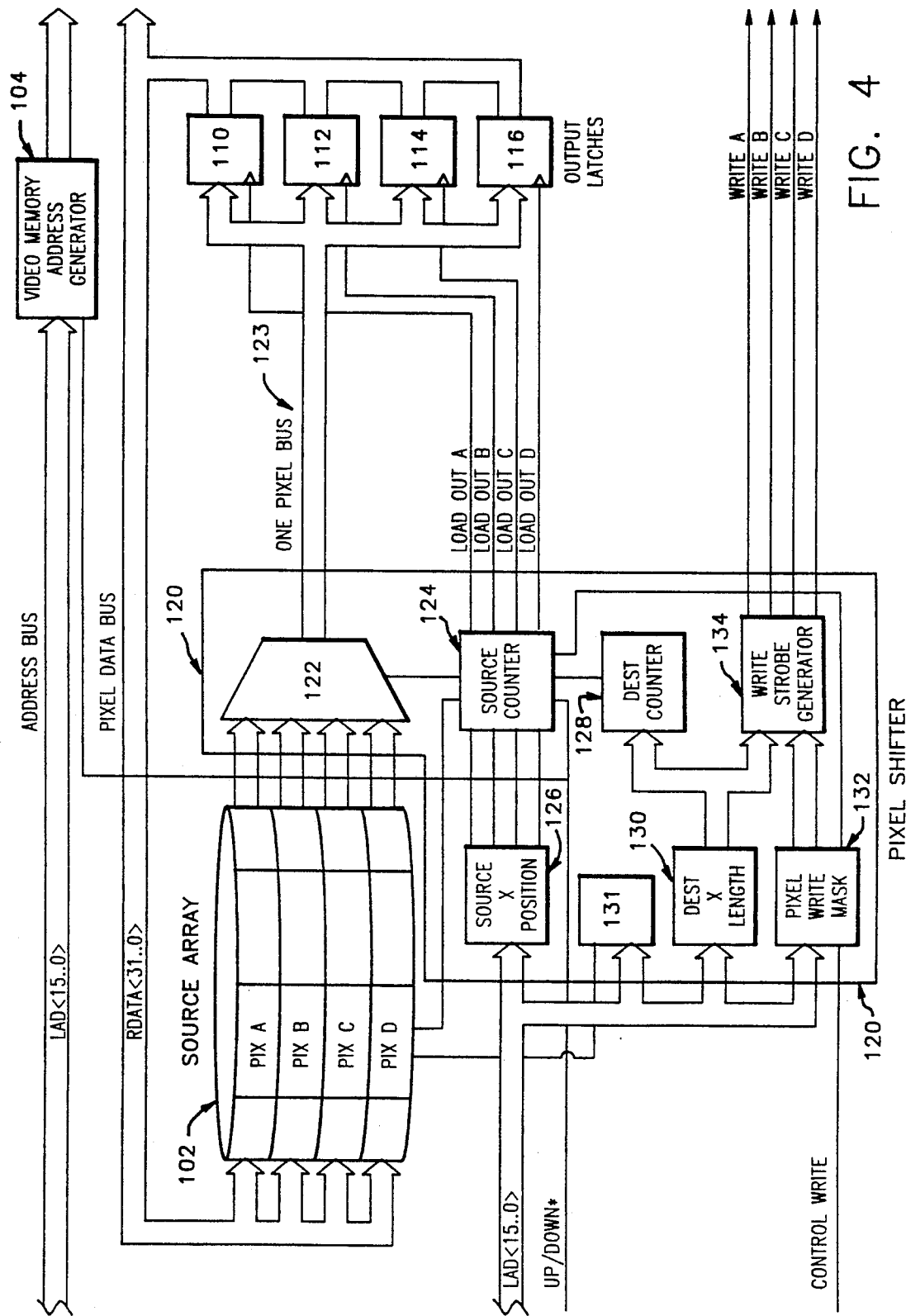
FIG. 4 is a block diagram of the pixel color processor in the local bus controller (LBC) of FIG. 2 according to the present invention.

Referring now to FIG. 4, the pixel color processor according to the preferred embodiment is generally shown. The pixel color processor includes a video memory address generator 104 which is coupled between the LAD<15:0> GSP address bus and the RADDR<8:0> address bus. The video memory address generator 104 receives source monomap addresses from the GSP 52 on the LAD<15:0> lines and generates the corresponding addresses to address the color pixel data or pattern data stored in the DRAM 56 and VRAM 58. The video memory address generator 104 receives destination monomap addresses from the GSP 52 on the LAD<15:0> lines and generates the corresponding addresses which are provided to the VP 58 to store color pixel data or pattern data in the VRAM 58. As already noted, in the preferred embodiment the VRAM 58 uses its color expand features to provide new addresses for the color pixel data that is expanded onto pattern data. The monomap addresses received from the GSP 52 on the LAD<15:0> address lines comprise the most significant bits of the address generated by the video memory address generator 104. The video memory address generator 104 includes a modulo m counter which generates the least significant bits of the address generated by the address generator 104. In the present embodiment, one monochrome address in the monomap region corresponds to eight addresses in the color map and pattern regions in the DRAM 56 and VRAM 58. Therefore, the counter in the address generator 104 is a modulo 4 counter in the present embodiment. One monomap address corresponds to 1 pixel which corresponds to 8 color map addresses. However, due to the granularity of the GSP address bus, 16 pixels (in the monomap area) are output each GSP cycle. The writes of the 16 pixels are split into four 4 pixel page mode cycles, thus a modulo 4 counter. The video memory address generator 104 also preferably includes logic which generates a wait state or hold signal that is provided to the GSP 52 should the GSP 52 require a hold signal while the pixel color processor is performing pixel block transfer, color expand, or fill operations.

The pixel color processor includes a memory buffer referred to as the source array buffer 102, which is coupled to the VRAM 58 via the RDATA<31:0> pixel data bus. The source array buffer 102 preferably comprises 256 bits of storage according to the preferred embodiment, but other sizes for the source array 102 are also contemplated. During pixel block transfer operations, the source array 102 is an N×M pixel array where N is the number of pixels capable of being transferred on the RDATA<31:0> pixel data bus during pixel block transfer operations and M is twice the number of video memory read cycles required to fill one half of the source array. In an 8 bit per pixel mode, the source array is a 4×8 pixel array and the RDATA<31:0> pixel data bus is 4 pixels wide. During color expand and fill operations, the source array 102 holds 256 bits of pattern data and is therefore a 4×8 array of bytes of pattern data.

Pixel shifter logic 120 generates clocking signals that are provided to the source array 102 which controls the loading of data into the source array 102. Each pixel color processor video memory read operation loads one half of the source array 102 and therefore requires four page mode read cycles. The source array 102 is organized as a circular buffer and operates such that read and write operations are interleaved. Data is read into one half of the source array 102 on one cycle, and data in the other half of the source array 102 is written to a destination address in video memory on the next cycle. Read and write operations cannot operate simultaneously in the source array 102 since the GSP 52 triggers each operation. As previously mentioned, the GSP 52 triggers operation of the pixel color processor by setting the monomap bit in the LBC 54 and performing a block transfer or color expand instruction, generating monomap addresses on the address bus. Decode logic in the LBC 54 decodes the monomap addresses and triggers operation of the pixel color processor.

The source array 102 generates four 8-bit outputs that are provided to the pixel shifter logic 120 in the pixel color processor. During pixel block transfer operations, when the pixel data is stored in an 8 bit per pixel mode, these four 8 bit outputs comprise four 8 bit pixels. During color expand and fill operations, these four 8 bit outputs comprise 4 bytes of the pixel pattern residing in the source array 102. The pixel shifter logic 120 coordinates the transmission of data from the source array 102 to video memory.

The four 8 bit data outputs from the source array 102 are connected to the inputs of a multiplexer 122 inside the pixel shifter 120. Logic in the pixel shifter 120 controls the enabling of one of the M columns of data from the source array 102 to the inputs of the multiplexer 122. The multiplexer 122 array 102 into one bit data stream. This data is provided through an 8 bit bus referred to as the one pixel bus 123 to one of four 8 bit latches 110, 112, 114, and 116. The source counter logic 124 generates a select signal that is provided to the select input of the multiplexer 122. The source counter logic 124 also generates load and clocking signals that are connected to the respective inputs of each of the latches 110, 112, 114, and 116. The outputs of each of the latches 110, 112, 114, and 116 are connected to respective 8 bit lanes of the RDATA<31:0> pixel data bus.

The four 8 bit latches 110, 112, 114, and 116 are each double buffered latches which comprise two stages. The first stage of each of the latches 110, 112, 114, and 116 is coupled to the one pixel bus 123 output from the multiplexer 122 and is used to latch the data on the one pixel bus 123. After a complete set of N 8 bit pixels or bytes of pattern data have been latched into the first stage of each of the latches 110, 112, 114, and 116, the 32 bits of data are loaded simultaneously into the second stage. While the first stage is being reloaded with new pixel or pattern data, the data residing in the second stage is output to the appropriate addresses in the video memory.

The pixel shifter 120 includes various logic that determines the order in which the data in the source array 102 is transferred to video memory. The source counter logic 124 controls the operation of the pixel color processor according to the present invention. The source counter logic 124 includes a register referred to as the source counter register (not shown). The source counter register receives a signal referred to as UP/DOWN* from the LBC 54, which determines the direction of pixel data transfers to video memory. The UP/DOWN* signal indicates when high that the data transfer from the source array 102 is in the forward horizontal direction, meaning that the data is transferred to memory in a manner such that the pixels ultimately displayed on the monitor are displayed in the forward horizontal direction across the respective scan line on the monitor 34, and indicates when low that the data transfer is in the reverse horizontal direction, meaning that the pixel or pattern data is transferred to memory in a manner such that the resulting pixels are displayed in the reverse horizontal direction across the respective scan line on the monitor 34, as is described further below. The UP/DOWN* signal is the inverse of a bit in the source counter register referred to as the DIR bit. The DIR bit controls the block transfer horizontal direction of the pixel color processor. When the DIR bit is set to 0, the pixel color processor transfers data in the forward horizontal direction, and when the DIR bit is 1 the pixel color processor transfers data in the reverse horizontal direction.

Bits 4 through 0 of the source counter register generate a counter referred to as the source address counter, or the SX counter. The SX counter is a modulo 32 counter that generates an output to the source array 102 that enables one of the M columns of data in the source array 102 to the multiplexer 122. Logic in the source counter 124 also generates the select signal provided to the select input of the multiplexer 122 that determines the sequence in which the data input to the multiplexer 122 is output to the one pixel bus 123 next. Logic in the source counter 124 also generates load and clocking signals that are provided to the respective inputs of each of the four latches 110, 112, 114, and 116. The respective load signals are asserted to enable the respective latches 110, 112, 114, and 116 to receive the pixel or pattern data output from the multiplexer 122 when the SX counter changes state. Logic in the source counter 124 also generates output enable signals that are provided to each of the latches 110, 112, 114 and 116 which enable them to output pixel or pattern data to video memory.

The pixel shifter logic 120 includes a register referred to as the source X position register 126. The inputs of the register 126 are connected to the LAD<15:0> data bus, and the outputs of the register 126 are connected to the inputs of the source counter register in the source counter logic 124. The source X position register 126 holds a static copy of the initial value of the SX counter and is used to refresh the SX counter on each new row or scan line of transmission.

The pixel shifter logic 120 includes a counter referred to as the destination counter 128. The destination counter 128 is a down counter used to determine how many pixels or bits of pattern data to transfer to each respective scan line. A register referred to as destination X length 130 holds a static copy of the initial value of the destination counter 128 and is used to load the initial value of the destination counter 128 for each scan line. Whenever the destination counter 128 reaches 0, logic (not shown) associated with the destination counter 128 alerts the SX counter and destination counter 128 so that they can be loaded or reinitialized by their associated registers, the source X position register 126 and the destination X length register 130, respectively.

The pixel shifter 120 includes read strobe generation logic 131 according to the present invention. The read strobe generation logic 131 is coupled to the source array 102 and the LAD<1:0> data/address bus. When the GSP 52 is in a one bit pixel mode and reads addresses in the source monomap area, the read strobe generation logic 131 returns a data value to the GSP 52. The read strobe generation logic 131 can be programmed to provide any data value to the GSP 52 in response to the GSP's source monomap read operation, but is programmed to return a data value of all ones (FFFFh) according to the present embodiment. The read strobe generation logic 131 is also coupled (not shown) to the VRAM 58 and generates page mode read cycles to the VRAM 58 to load the source array 102 with pixel color or pattern data when the GSP 52 performs a source monomap read operation.

The pixel shifter 120 includes pixel write mask logic 132 according to the present invention. The pixel write mask logic 132 is connected to the LAD<15:0> bus of the GSP 52 and receives a control write signal from the GSP 52 to enable it to receive monomap destination write data from the GSP 52.

If the GSP 52 is unaware of the presence of the pixel color processor, it operates on these pixel bits received from the read strobe generation logic 131 and generates corresponding one bit pixel data that it writes to destination monomap addresses. If the GSP 52 is aware of the presence of the pixel color processor, then it may either operate on the one bit pixel data received from the read strobe generation logic 131 or it may substitute a different write mask pattern. The pixel write mask logic 132 intercepts this one bit pixel data generated by the GSP 52 and serializes this data beginning with the least significant bit. This data is provided to write strobe generator logic 134, which generates a sequence of write strobe signals that are provided to the video memory. These write strobe signals are used to determine which pixel write operations are enabled within the four subsequent page mode cycles where the data in the output latches is output to the video memory.

During pixel block transfer operations, the write strobe generator logic 134 uses this data as a write mask for the color pixel data that is output from the source array 102 and generates a sequence of write strobe signals that are provided to the VRAM 58. Where a 0 exists in the one bit pixel data output from the GSP 52, the write strobe signal for the corresponding pixel in the source array 102 will have a 0 value, thus preventing that pixel from being written to video memory and effectively preventing the respective pixel in video memory from being overwritten by new data. The pixel is thus said to be transparent. If the GSP 52 outputs a 1 value for a respective pixel, signifying that pixel should be turned on, then the write strobe signal for the corresponding color pixel will have a one value, thus enabling that pixel to be written to video memory.

During color expand and fill operations, the write strobe generator logic 134 uses this data as a write mask for the pixel pattern data that is output from the source array 102 and generates a sequence of write strobe signals that are provided to the video memory. Each bit in the pixel pattern residing in the source array 102 represents one pixel. Since each bit in the one bit per pixel data output from the GSP 52 acts as a write mask for a byte of data in the source array 102, each bit in the write mask generated by the GSP 52 effectively behaves as a write mask for eight pixels. Therefore, where a 0 exists in the one bit pixel data output from the GSP 52, the write strobe signal for the corresponding eight bits of pattern data in the source array 102 will have a 0 value, thus preventing the eight pixels which correspond to the eight bits of pattern data in the source array 102 from being written to video memory and effectively discarding those pixels. If the GSP 52 outputs a 1 value for a respective eight bits of the write mask in the source array 102, signifying that the eight pixels corresponding to those eight bits should be turned on, then the write strobe signal for the corresponding eight pixels will have a one value, thus enabling those pixels to be written to video memory. Therefore, the granularity of the write mask generated by the GSP 52 during color expand and fill operations is 8 pixels, meaning that each bit in this write mask ultimately either discards or turns on eight pixels that are written to video memory.

The GSP 52 can use the write mask that it generates to perform pixel boundary adjustments. During pixel block transfer operations, each bit in the write mask generated by the GSP 52 corresponds to one pixel in the source array 102. Therefore, during pixel block transfers, the GSP 52 can adjust the boundaries of an image by individual pixels. However, during color expand operations, each bit in the GSP write mask corresponds to 8 pixels, and therefore the GSP 52 no longer has the ability to mask individual pixels. Instead, the GSP 52 can only adjust images on 8 pixel boundaries, meaning, for example, that for each respective scan line it can only begin an image on pixel number 0, 8, 16, 24, and so on.

The operation of the pixel shifter 120 can be summarized as follows. When the GSP 52 performs a write operation to addresses in to the destination monomap area, the pixel or pattern data located in the source array 102 is written to the appropriate locations in the VRAM 58 or video memory, and the order in which the data is written is determined by four elements in the pixel shifter logic:

1. The value of the transfer direction (DIR) bit.
2. The current value of the SX counter in the source counter register.
3. The one bit pixel data written by the GSP 52 to the 16 bit location in the destination monomap area, which is used as a write mask.
4. The value of the 16-bit destination counter.

The pixel shifter 120 operates in an identical manner regardless of whether the pixel color processor is performing a pixel block transfer operation where the source array 102 holds pixel color data or whether it is performing color expand operations where the source array 102 holds a pixel pattern. A description of how the above elements in the pixel shifter logic 120 work together during pixel block transfer operations follows. A description of how the pixel shifter 120 operates during color expand and fill operations is similar, except that the 8 bit pixels discussed below for pixel block transfers correspond to 8 bits of pattern data during color expand and fill operations.

In this example, the DIR bit in the source counter register is 0, indicating forward horizontal data transfers. The pixels in the source array are numbered P0 through P31, and the initial value held in the SX counter is 1. If the one bit pixel data written to the destination monomap area is 1111 000 1111 0000 for pixels P16 through P0, respectively, the following data will be written into the VRAM 58:

... xx, xx, xx, xx, P5, P6, P7, P8, xx, xx, xx, xx, P13, P14, P15, P16 ...

The operation of the pixel color processor causes the first four source array pixels (beginning at P1) to be loaded into the latches 110, 112, 114, and 116, but the lower four bits of the write mask data prevent these values from being written into the VRAM 58. The operation of the write strobe generator 134 causes no data to actually be written on the first cycle of the 4 page mode write cycles. Pixels P5, P6, P7, and P8 are written out on the second page mode cycle. Pixels P9, P10, P11, and P12 are loaded into the latches 110, 112, 114, and 116 on the third page mode cycle, but the write strobe generator 134 prevents these values from being written into the VRAM 58. Pixels P13-P16 are written to the VRAM 58 on the fourth page mode write cycle. The GSP 52 preferably interleaves its destination monomap write operations with source monomap read operations in order to load the appropriate portions of the source array 102 with pixel data. This effects an efficient block transfer in the forward horizontal direction. Block transfers in the vertical direction can be controlled through the sequence of monomap addresses presented to the pixel color processor by the GSP 52.

As previously discussed, pixel block transfers can also be effected in the reverse horizontal direction, meaning that the pixel data is written in the reverse order in video memory and appears from right to left on the video monitor 34. As with block transfers in the forward horizontal direction, the SX counter is a modulo 32 counter pointing to the next active pixel in the 32-pixel source array (2 16-pixel halves). The one bit pixel data written by the GSP 52 is used to determine which pixel writes are enabled within the four subsequent page mode cycles and whether the SX counter is decremented.

Thus, if the one bit pixel data written to the destination monomap area by the GSP 52 is all 1's, the upper four bits of this data [15..12] cause the four source array pixels beginning with the initial value in the SX counter (and counting down) to be loaded into a latch forming the data for the first cycle of the 4 page mode write cycles. If source array pixels are number P0 through P31 and the initial value of the source counter is 5 source array pixels P5, P4, P3 and P2 are written out on the first page mode cycle (P5 most significant); pixels P1, P0, P31, and P30 are written out on the second page mode cycle, pixels P29 through P26 on the third page mode cycle, and pixels P25 through P22 on the fourth page mode cycle. The next GSP write operation to the preceding 16 bit address in the destination monomap area with only the first 13 data bits [0:12]1's and the remainder [13:15] 0's causes the sequence: P21-P1; P17-P14; P13-10; and P9 along with 3 don't care pixel values. As before, the GSP 52 preferably interleaves its destination monomap write operations with source monomap read operations in order to load both the respective halves of the source array 102 with data. Therefore, the above sequence effects an efficient block transfer of color pixel data to the video memory in the reverse horizontal direction.

The final parameter that affects both the forward and the reverse horizontal direction operation is the value held in the destination counter 128. The destination counter 128 is loaded with an initial value which determines how many pixels are transferred to the respective scan line. The destination counter 128 determines when a new scan line is selected for output data and the SX counter is reloaded with the last value written to the source X position register 126. When the destination counter 128 counts down to 0, the SX counter is reloaded to reset the counter to the alignment valid at the beginning of a scan line row within a video memory block transfer. Therefore, the SX counter effectively acts as a source array pixel pointer, and the value in the destination X length register 130 is used to reload the destination counter 128 each time the counter counts down to zero.

The operation of the pixel color processor can be summarized as follows. When the GSP 52 wishes to use the services of the pixel color processor, it sets the monomap bit in the LBC 54, enters a one bit per pixel mode, and sets or clears the block trnasfer and source array bits. If the GSP 52 wishes to perform a pixel block transfer using the services of the pixel color processor, it sets the block transfer bit to a logic high value. If the GSP 52 wishes to perform a color expand or fill operation using the services of the pixel color processor and the color expand features of the V 58 to perform color expand operations, it clears the block transfer bit and sets the source array bit. The cleared block transfer bit causes the LBC 54 to assert the color expand signal to the VRAM 58 to enable the VRAM 58 to use its block write or color expand features.

The GSP 52 then reads the appropriate addresses in the source monomap region which correspond to the addresses in the color map region where the desired color pixel data or pixel pattern data is located. The video memory address generator 104 receives these monomap addresses and generates the corresponding video memory addresses where the desired data is actually located in video memory. The read strobe generator logic 131 uses these addresses to generate page mode read cycles to load one half of the source array buffer 102 with the appropriate data from the video memory. The GSP 52 then performs a second source monomap memory read to load the second half of the source array buffer 102 with data.

If the GSP 52 is unaware of the presence of the pixel color processor, then it expects 16 bits of data to be returned from video memory in response to each of its read cycles. The pixel write mask logic 132 preferably places hex value FFFFh onto the GSP's LAD<15:0> data bus in response to the memory read, thereby fooling the GSP 52 into thinking that it has received all ones back from its read operation. The GSP 52 operates on this data to form an image that it wishes to display onto the screen, and this image is used as a write mask for the data residing in the source array 102. If the GSP 52 is aware of the presence of the pixel color processor, then it may alternately ignore the "dummy data" provided by the pixel write mask logic 132 and substitute its own write mask data. However, the 34010 graphics processor used as the GSP 52 in the preferred embodiment cannot use its own block transfer or color expand instructions if it wishes to ignore the dummy data and provide its own write mask data.

The GSP 52 then performs a write operation to the monomap destination addresses corresponding to the desired memory locations where the data is to be written to video memory. The video memory address generator 104 receives the monomap destination addresses and generates the correct video memory addresses where the data is to be written in video memory. The per pixel write mask logic 132 also intercepts the one bit per pixel data output from the GSP 52 and the write strobe generator 134 uses this data to generate write strobe signals which act as a write mask for the data in the source array 102. If GSP 52 is performing a block transfer operation and the data in the source array 102 is pixel color data, then the write mask generated by the GSP 52 determines which color pixels are actually written to video memory. If the GSP 52 is performing a color expand or fill operation and the data in the source array 102 comprises a pixel pattern, then each bit in the write mask generated by the GSP 52 determines whether the eight pixels corresponding to the respective byte of data in the pixel write mask in the source array 102 are written to video memory.

The pixel shifter logic 120 controls the data that is output from the source array buffer 102 to the output latches 110, 112, 114, and 116. After a complete set of N pixels or N bytes of pattern data have been latched into the first stage of the latches 110, 112, 114, and 116, the data is loaded into the second stage. On the subsequent destination monomap write operation, the data in the second stage of the latches 110, 112, 114, and 116 is written to video memory by page mode write cycles generated by the LBC 54.

If the pixel color processor is performing a pixel block transfer operation and the data in the source array 102 is color pixel data, then the pixel data is simply stored in the appropriate addresses in video memory. If the GSP 52 is performing a color expand or fill operation and the data in the source array is a pixel pattern, then the color expand features of the VRAM 58 are used to expand color pixel data onto the pixel pattern. The manner in which the color pixel data is expanded onto the pixel pattern depends on whether a color expand or fill operation is being performed, as was explained above. The VRAM 58 also uses its addressing features to generate new addresses for the newly formed color pixel data. The newly formed color pixel data is then stored in the appropriate locations in memory. Thereafter, the GSP 52 can alternate between monomap read and write cycles to alternately fill one half of the source array 102, and write the data residing in the other half of the source array 102 through the output latches 110, 112, 114, and 116 to video memory.

When the GSP 52 writes this one bit pixel data back to the appropriate destination address, it can then turn to other tasks. Therefore, the GSP 52 can operate on pixel data in a one bit per pixel format, wherein each bit either corresponds to an 8 bit pixel or a byte of pattern data that in turn corresponds to eight 8 bit pixels, depending on whether a block transfer instruction or an expand/fill instruction is executed, respectively. This reduces the amount of data manipulation required by the graphics processor, thereby increasing its speed and efficiency and allowing it to operate on more pixels per operational cycle.

Figure 5:
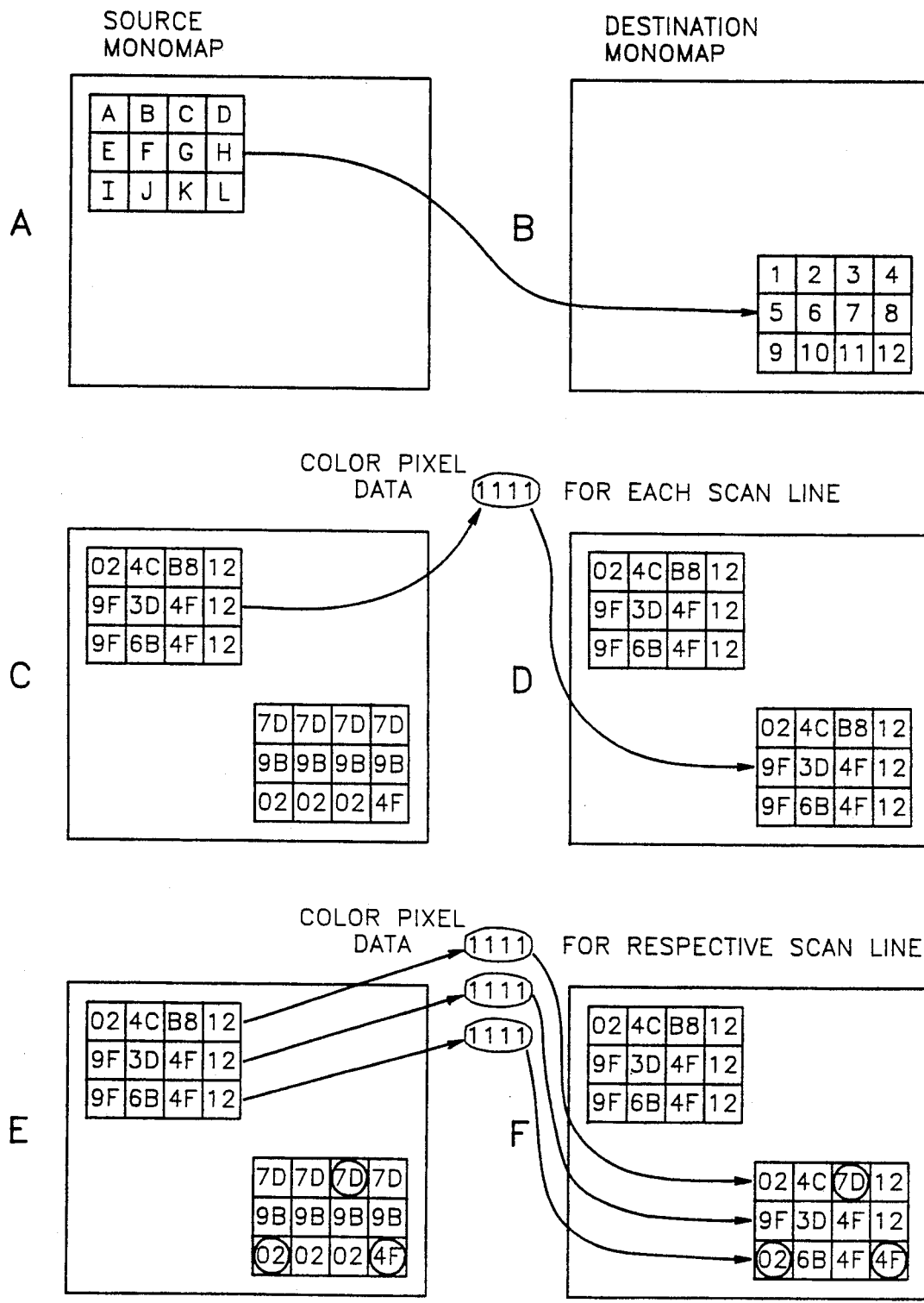
FIG. 5 is a diagram illustrating pixel block transfer operations according to the present invention.

Referring now to FIG. 5, an illustration of a pixel block transfer in the forward horizontal direction is shown. Portion A of the figure illustrates data in the source monomap which is to be written to a location in the destination monomap, as illustrated by B. Portion C of the figure illustrates the pixel color data corresponding to the source and destination monomap areas prior to the block transfer, and portion D illustrates the pixel color data after the transfer has completed. In the transfer illustrated by C and D, the pixel write mask for the transfer was 1111 for each scan line, and therefore the pixel color data from the source area completely overwrites the pixel color data in the destination area. Portion E illustrates the pixel color data corresponding to the source and destination monomap areas prior to the block transfer, which is identical to C. Portion F illustrates the pixel color data after the transfer has completed with the values 1101, 1111, and 0110 used for the respective scan lines.

Referring again to FIG. 4, the GSP 52 can perform color expand operations using the color expand features of the VRAM 58 and without using the services of the pixel color processor according to the present invention. According to this method, the block transfer bit is cleared, indicating a color expand or fill operation, and the source array bit is also cleared, indicating that the source array 102 in the pixel color processor is not used. When the source array bit has a one value, the pixel color processor is enabled, as was described in the preferred embodiment, and when this bit has a zero value, the pixel color processor is disabled except for the read strobe generation logic 131.

In this method, when the GSP 52 performs a source monomap read operation, the read strobe generation logic 131 returns a value to the GSP 52, and no other operation of the pixel color processor is engaged. When the GSP 52 performs a write operation to the destination monomap area, the pixel color processor is not engaged, and the special color expand features of the VRAM 58 are engaged. The VRAM 58 receives the monomap destination write data from the GSP 52 through the lower or upper halves of the RDATA<31:0> bus. The LBC 54 asserts the color expand signal to the VRAM 58 since the block transfer bit is cleared. The asserted color expand signal directs the VRAM 58 to use the data it receives from the GSP 52 as a pixel pattern and expand the color pixel data in its color registers onto these bits depending on whether the operation is a color expand or fill operation, as was explained above.

This method does not require use of the pixel color processor and therefore can be implemented with less circuitry. However, this method is slower and less efficient than the method described above where the source array 102 in the pixel processor was used to store pixel pattern data because use of the source array 102 enables the GSP 52 to effectively manipulate eight 8 bit pixels with each bit of monomap data. When the pixel color processor is not used and the pattern data output from the GSP 52 is written directly to the VRAM 58, then the GSP 52 is only effectively manipulating one eight bit pixel with each bit of destination monomap data.

The LBC 54 (FIG. 2) preferably includes color expand logic associated with the pixel color processor according to the present invention which mimics the color expand features of the VRAM 58. This logic is used when the VRAM 58 being used does not have color expand features. The color expand logic in the LBC 54 enables the GSP 52 to perform a color expand operation similar to that described above without use of the source array 102 in the pixel color processor or use of the color expand features of the VRAM 58.

Figure 6:
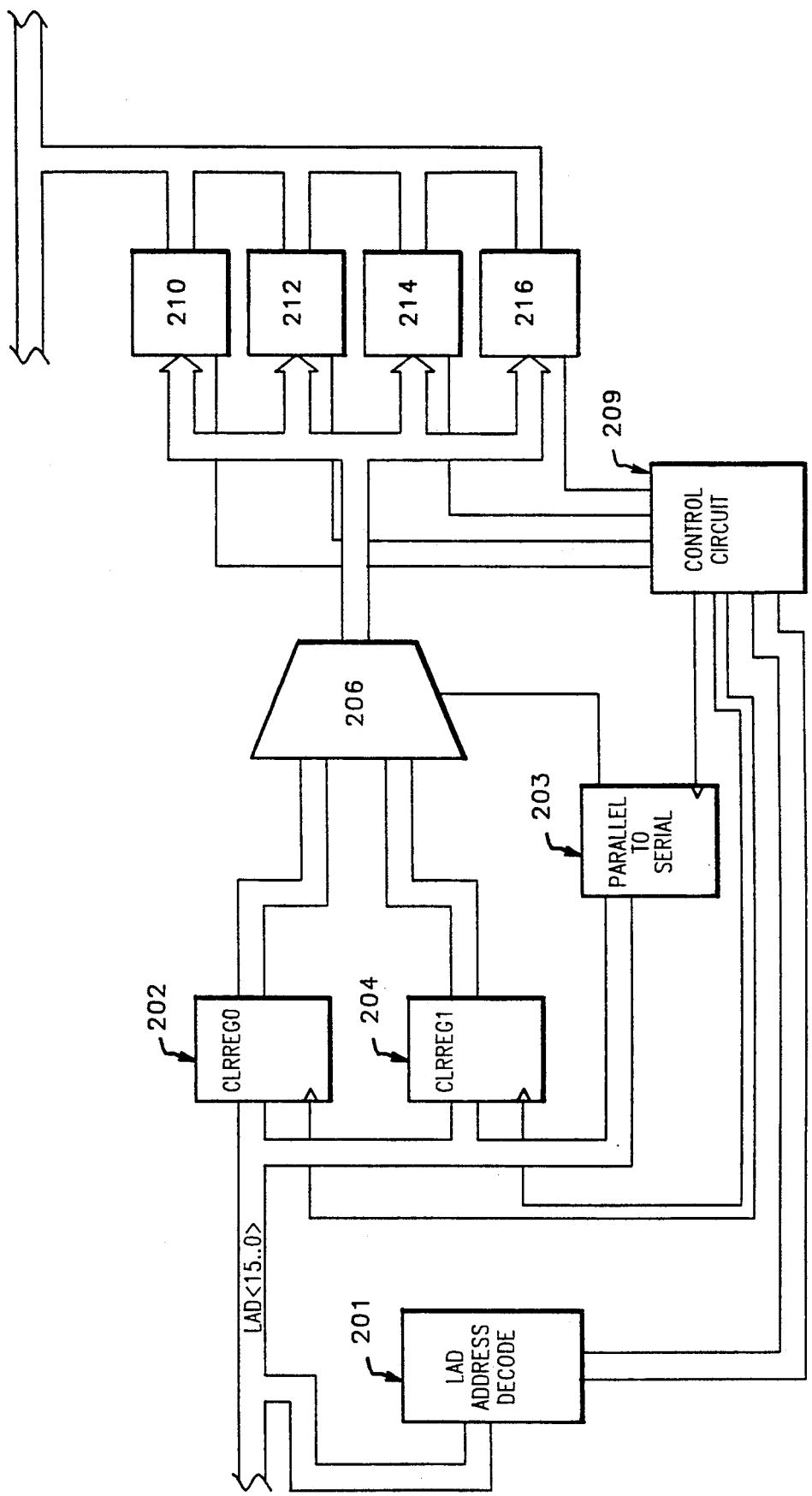
FIG. 6 is a schematic logic diagram of color expand logic in the local bus controller (LBC) of FIG. 2.

Referring now to FIG. 6, the color expand logic in the LBC 54 includes two programmable color registers referred to as CLRREG0 202 and CLRREG1 204 which hold color pixel data. These registers are preferably eight bit registers according to this embodiment. The inputs of each of the registers 202 and 204 are coupled to the lower byte of the LAD<15:0> data bus. Address decode circuitry 201 in the LBC 54 is connected to the LAD <15:0> bus and decodes monomap addresses generated by the GSP 52. A block circuit 209 comprising control circuitry is coupled to the LAD<15:0> bus address decode circuitry 201 and generates clocking signals that are provided to clock inputs of each of the registers 202 and 204. The block circuit 209 is activated to generate the clocking signals when the address decode logic in the LBC 54 decodes a monomap address. Each of the color registers 202 and 204 output their color data to an eight bit 2 to 1 multiplexer 206. The pattern data written by the GSP 52 during its monomap destination write operation is provided to the inputs of an 8 bit parallel in, serial out register 208. The control circuit 209 generates a clocking signal that is provided to the clock input of the register 208. Data in the register 208 is output in a serial manner from the register 208 to a select input of the multiplexer 206 according to the clocking signal. The clocking signal provided to the register 208 preferably has at least eight times the cycling frequency of the GSP's LAD<15:0> data bus to enable the register 208 to convert the eight bits of parallel data from the GSP 52 into a serial data stream.

If the respective bit of the monomap write data is a 0 value, then the color data residing in CLRREG0 202 is selected as the output of the multiplexer 206. If the respective bit of the monomap write data is a 1 value, then the color data residing in CLRREG1 204 is selected as the output of the multiplexer 206. In this manner, the data output from the GSP 52 acts as a pixel pattern with the value of the respective bit in the pattern choosing which of the respective colors in CLRREG0 202 and CLRREG1 204 are expanded on the respective pixel corresponding to that bit. The color expand circuitry in the LBC 54 can also be designed to perform fill operations according to the present embodiment.

The 8 bit output of the multiplexer 206 is provided to four 8 bit latches 210, 212, 214, and 216. The control circuit 209 provides load and clocking signals to the latches 210, 212, 214, and 216 and determines the order in which the latches 210, 212, 214, and 216 are loaded with pixel data. The latches 210, 212, 214, and 216 operate in a similar manner to the 8 bit latches 110, 112, 114, and 116 described above. The latches 210, 212, 214, and 216 are double buffered latches comprising two 32 bit stages that are used to latch the color pixel data from the multiplexer 206. Each stage of the latches 210, 212, 214, and 216 is 32 bits wide to hold the 32 bits of color pixel data that is expanded on the eight bits of pattern data written by the GSP 52. After a complete set of eight 8 bit pixels have been latched into the first stage, these pixels are loaded into the second stage. While the first stage is being loaded with new pixel data, the pixel data in the second stage is output to video memory using two 32 bit page mode write cycles. The data in the latches 210 and 212 is preferably output in the first write cycle and the data in the latches 214 and 216 is preferably output in the second write cycle.

The video memory address generator 104 receives the monomap addresses produced by the GSP 52 during the write cycle and translates these addresses into the appropriate addresses where the expanded color data is to be written in video memory. In this instance, the video memory address generator 104 performs the addressing operation that is part of the color expand features of the VRAM 58. Therefore, the monomap addresses produced by the GSP 52 do not require that their least significant bits be replaced with new least significant bits because the video memory address generator 104 translates each of the monomap addresses into four addresses, and these four addresses are used to store the expanded color pixel data in the VRAM 58. The expanded color pixel data is output to the appropriate addresses in video memory as determined by the address generator 104.

Therefore, the operation of the color expand logic in the LBC 54 can be summarized as follows. When the GSP 52 performs a source monomap read operation, all ones are returned to the GSP 52 and no other operation is performed. When the GSP 52 performs a destination monomap area write operation, the color expand circuitry (FIG. 6) in the LBC 54 is activated. The video memory address generator 104 (FIG. 4) receives the monomap addresses from the monomap write operation and generates the corresponding video memory addresses where the pixel data is to be stored. The pattern data written by the GSP 52 is provided to the parallel in, serial out register 208, which serializes the data and provides a serial bit stream to the select input of the multiplexer 206. The value of the respective bit at the select input of the multiplexer 206 determines which of the respective 8 bits of color pixel data is expanded onto the respective bit. The 8 bit pixel data is output from the multiplexer 206 and is loaded into one of the four latches 210, 212, 214, and 216 according to the respective load signals provided by the control circuit 209. When the first stage of the latches 210, 212, 214, and 216 is full, the color pixel data is loaded into the second stage, where it is then written to video memory.

Figure 7:
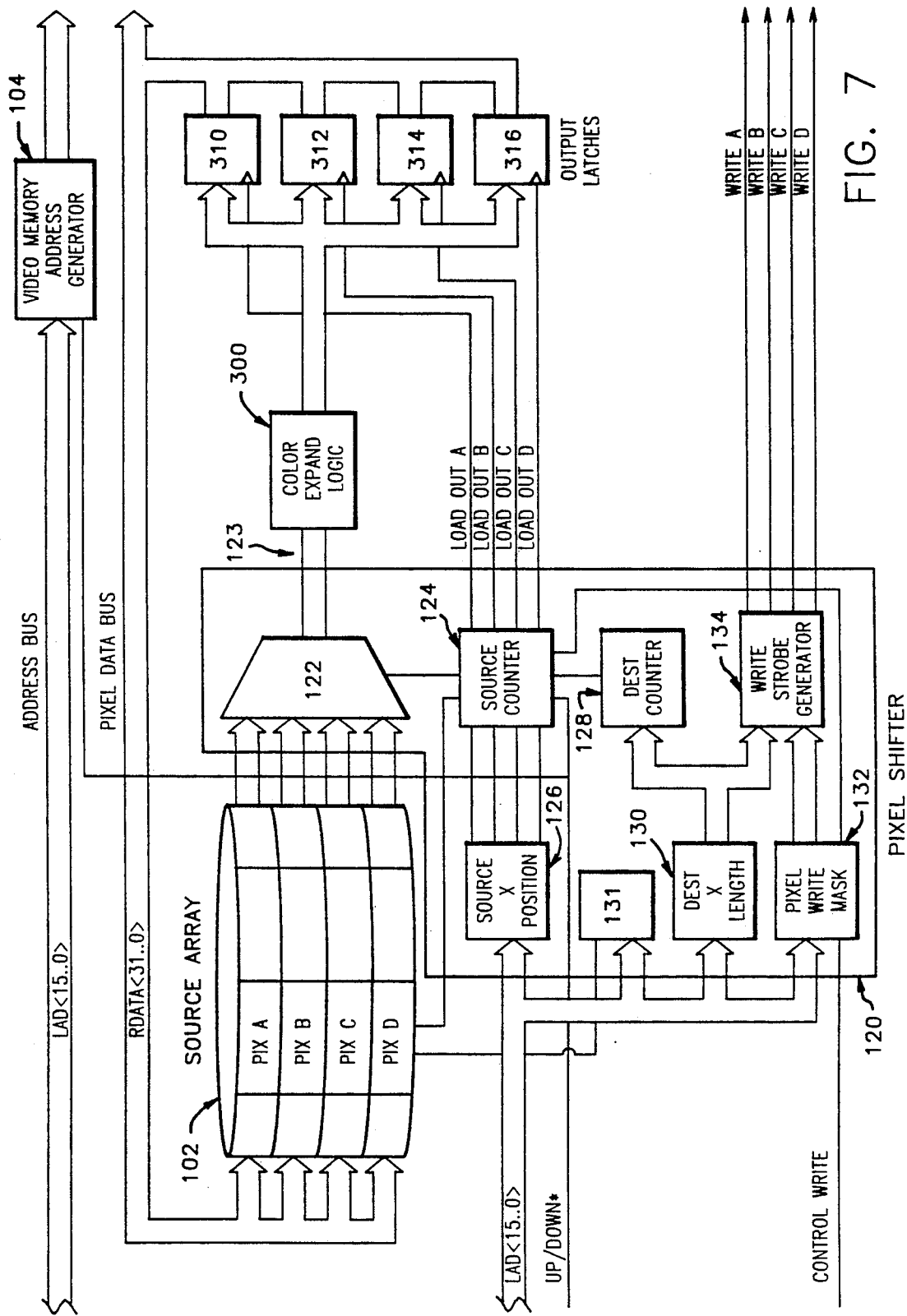
FIG. 7 is a block diagram of the pixel color processor of FIG. 4 including color expand logic and enhanced output latches according to an alternate embodiment of the present invention.

In another embodiment of the present invention, the pixel color processor includes color expand logic which mimics the color expand operation of the VRAM 58. The incorporation of color expand logic into the pixel color processor enables the GSP 52 to perform color expand and fill operations using the source array 102 without requiring color expand features in the VRAM 58. Referring now to FIG. 7, the pixel color processor includes color expand logic 300 coupled between the multiplexer 122 and output latches 310, 312, 314, and 316. The source counter logic 124 in this embodiment generates a clocking signal that is provided to the color expand logic 300. The color expand logic 300 is coupled to the LAD<15:0> address/data bus.

Figure 8:
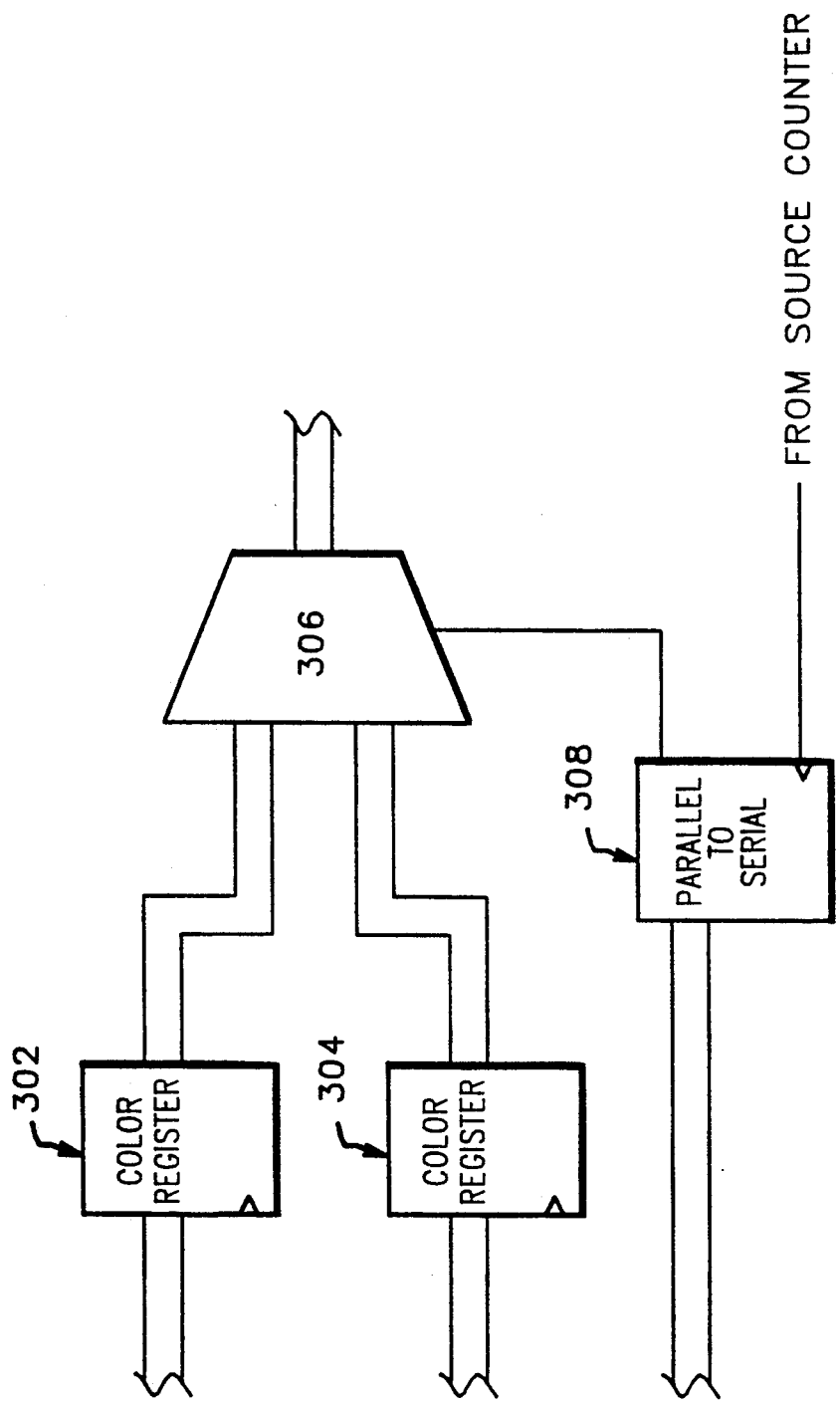
FIG. 8 is a schematic diagram of the color expand logic of FIG. 7.

Referring now to FIG. 8, the color expand logic 300 includes logic similar to the color expand logic (FIG. 6) located in the LBC 54 in the above embodiment. The color expand logic 300 includes two color registers 302 and 304 coupled to a multiplexer 306 and also includes a parallel in, serial out register 308 whose serial output is coupled to the select input of the multiplexer 306. A clocking signal from the source counter 124 is connected to the clock inputs of each of the registers 302, 304, and 308. The pixel pattern data is output from the source array 102 to the parallel in, serial out register 308, which provides a serial data stream to the select input of the multiplexer 306. This data stream selects between color pixel data stored in the color registers 302 and 304 that is expanded onto the pattern data.

Referring again to FIG. 7, the newly formed color pixel data is then supplied to output latches 310, 312, 314, and 316. The latches 310, 312, 314, and 316 are similar to the output latches 210, 212, 214, and 216 described above and are uses to hold the color pixel data before it is output to video memory. The latches 310, 312, 314, and 316 are 16 bit double buffered latches wherein each stage of the latches can hold 64 bits of color pixel data. The latches 310, 312, 314, and 316 are preferably cycled 4 times as fast as the latches 110, 112, 114, and 116 used in the first embodiment in order to keep up with the operation of the GSP 52. Recall that each stage of the latches 110, 112, 114, and 116 used in the first embodiment holds 32 bits of pattern data corresponding to 32 pixels when the pixel color processor is performing a color expand operation. However, in this embodiment, color pixel data is expanded onto the pattern data output from the source array 102 before the data is provided to the output latches 310, 312, 314, and 316. Therefore, each stage of the latches 310, 312, 314, and 316 used in this embodiment hold 64 bits of color pixel data corresponding to only 8 pixels. Therefore, the latches 310, 312, 314, and 316 preferably cycle 4 times as fast as the latches 110, 112, 114, and 116 in the first embodiment to enable them to output the 8 bits of color pixel data corresponding to each of the 32 pattern bits output from the source array 102.

In this embodiment, the LBC 54 preferably includes addressing logic which mimics the addressing capabilities which are included in the color expand features of the VRAM 58. This logic receives the addresses output from the video memory address generator 104 and replaces the appropriate least significant bits to form new addresses for the expanded color pixel data. The expanded color pixel data is then written to these addresses in the video memory.

Referring again to the first embodiment in FIG. 4, when the GSP 52 is using the pixel color processor to perform color expand operations, each bit in the source and destination monomap areas correspond to eight 8 bit pixels according to the present embodiment. As previously discussed, the GSP 52 can only align data on 8 pixel boundaries in this instance, meaning that it can only perform a boundary adjustment of eight pixels at a time. In other words, the GSP 52 has lost its full or individual pixel addressing capability, meaning that it can no longer address each pixel individually, but rather can only address a block of eight pixels at a time. For example, if the GSP 52 wished to use the features of the pixel color processor to manipulate pattern data and display an image that begins four pixels from the left edge of the monitor screen on each respective scan line, it would be unable to do so. Each bit in the respective monomap areas correspond to eight pixels, and therefore the GSP 52 would be unable to align an image on any boundary other than a pixel boundary that was a multiple of eight. Therefore, in the first embodiment (FIG. 4), the GSP 52 is unable to align an image on any pixel boundary other than a boundary that is a multiple of eight during color expand operations using the pixel color processor.

Figure 9:
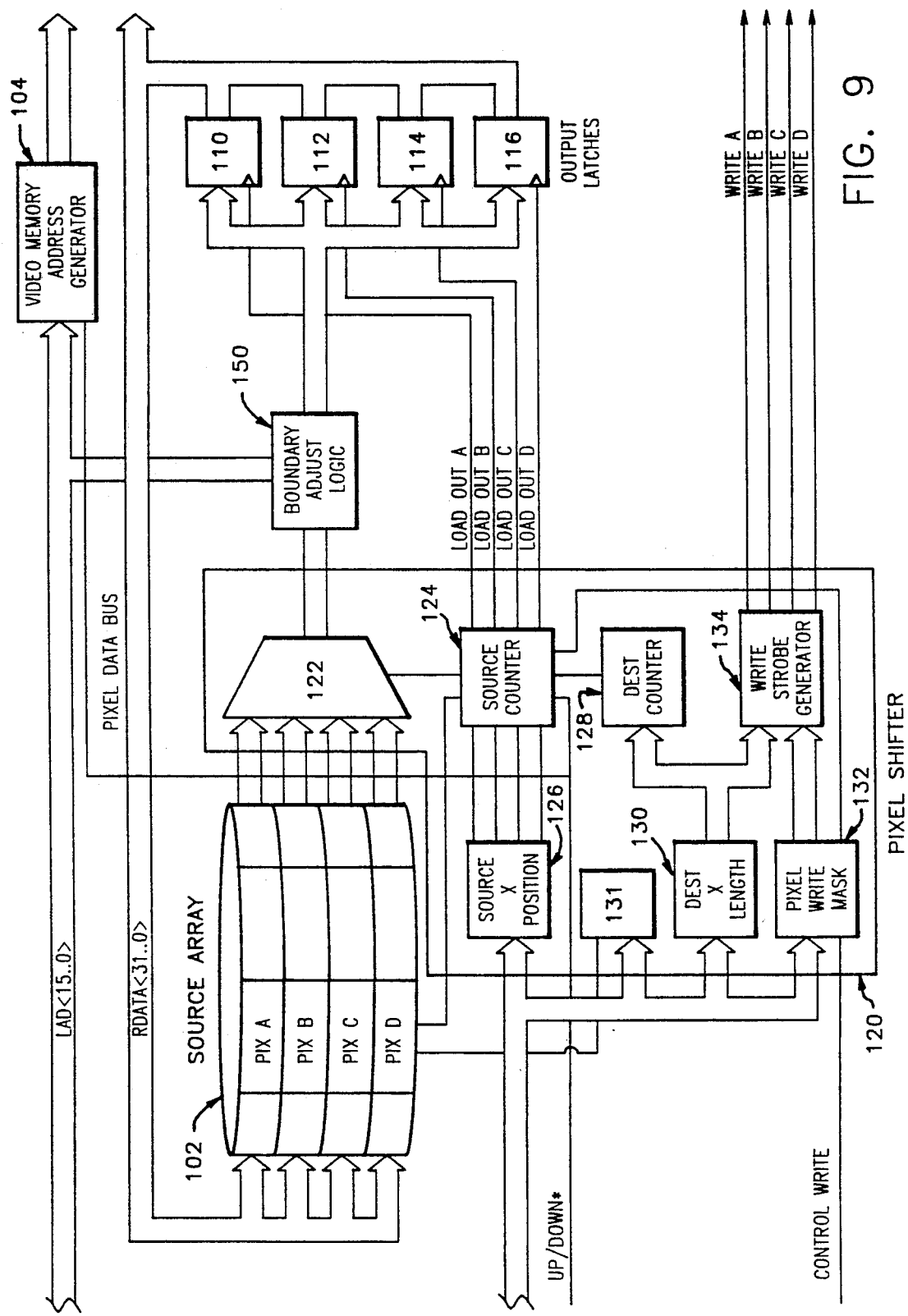
FIG. 9 is a block diagram of the pixel color processor of FIG. 4 including pixel boundary adjustment logic according to an alternate embodiment of the present invention.

Referring now to FIG. 9, an embodiment of the present invention is shown which enables the GSP 52 to align respective sides of an image on any respective pixel boundary while using the services of the pixel color processor to manipulate pattern data. This embodiment of the present invention includes a block circuit referred to as boundary adjustment logic 150 situated on the one pixel bus 123 and coupled between the output of the multiplexer 122 and the inputs to the latches 110, 112, 114, and 116. The boundary adjustment logic 150 is also coupled to the LAD<15:0> address/data bus. The source counter logic 124 generates clocking signals that are provided to the boundary adjustment logic 150.

Figure 10:
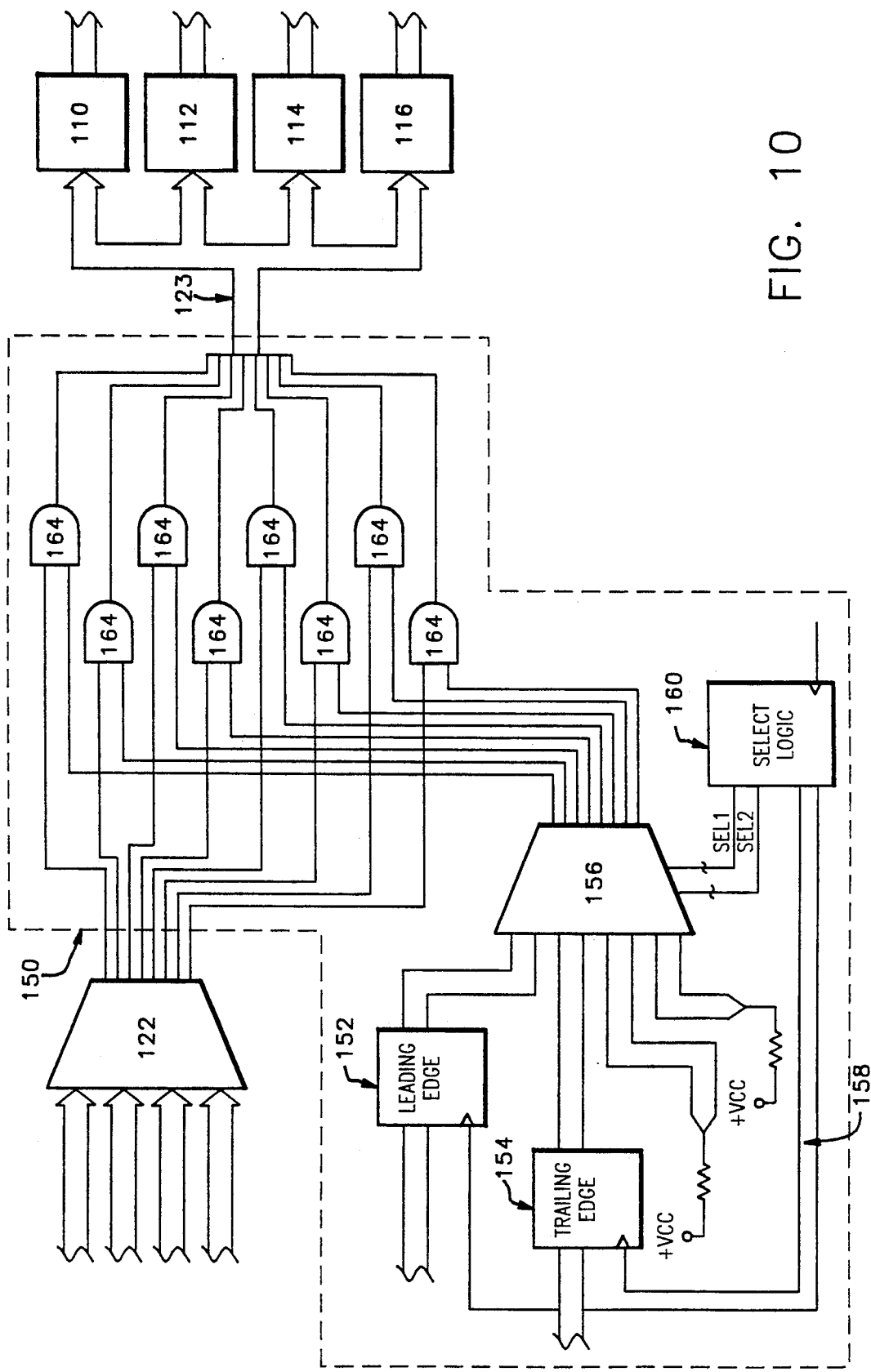
FIG. 10 is a schematic logic diagram of the boundary adjustment logic of FIG. 9.

Referring now to FIG. 10, the logic comprising the boundary adjustment logic 150 is shown. The boundary adjustment logic 150 includes two 8 bit programmable registers referred to as the leading edge register 152 and the trailing edge register 154. The leading edge and trailing edge registers 152 and 154 are used to hold pixel mask data for the leading edge or first eight pixels of an image and the trailing edge or last eight pixels of an image, respectively, for each respective scan line. The inputs of the registers 152 and 154 are coupled to the lower byte of the LAD<15:0> data bus. The outputs of the registers 152 and 154 are provided to the inputs of an 8 bit 4 to 1 multiplexer 156. The remaining 8 bit inputs of the multiplexer 156 are each tied to a logic high value according to this embodiment.

A block circuit referred to as select logic 160 receives the clocking signal generated by the source counter logic 124. The select logic 160 generates clocking signals that are provided to the clock inputs of each of the registers 152 and 154. The select logic 160 also generates two select signals referred to as SEL1 and SEL2 that are coupled to the select inputs of the multiplexer 156. The select logic 160 receives the clocking signal from the source counter logic 124 and uses this signal as a timing signal to aid in generating the select signals. Because this type of circuitry is well known to those skilled in the art, details of its implementation have been omitted for the purpose of clarity. The SEL1 signal selects between the input of the multiplexer which receives all 1 values and the registers 152 and 154. The SEL2 signal selects between the leading edge register 152 and the trailing edge register 154. The eight outputs of the multiplexer 122 in the pixel color processor are each connected to the input of a two input AND gate 164. The eight outputs of the multiplexer 156 are connected to the second inputs of each of the AND gates 164. The outputs of the AND gates 164 comprise the one pixel bus 123 and are coupled to the latches 110, 112, 114, and 116.

The cycling of the one pixel bus 123 in the pixel color processor is preferably at least 8 times as fast as that of the GSP's LAD<15:0> bus. This is because each bit manipulated by the GSP 52 in the monomap areas corresponds to eight bits of pattern data. Therefore, the introduction of the AND gates 164 into the one pixel bus 123 may delay the flow of data through the pixel processor such that the pixel processor is unable to keep up with GSP 52. Whether the pixel color processor can keep up with the GSP 52 depends on the speed of the logic in the pixel processor and how fast the VRAM 58 can be cycled.

When the GSP 52 wishes to use the services of the pixel color processor in performing a color expand operation in this embodiment, it first loads the leading edge and trailing edge registers 152 and 154 with mask data representing the desired pixel alignment of the image that it is to draw. The pattern data is then stored in the source array 102 as previously described. When the first eight bits of the pattern data are output from the multiplexer 122, the select logic 160 generates the SEL1 and SEL2 signals to select the values in the leading edge register 152 to be output from the multiplexer 156 and provided to the respective inputs of the AND gates 164. The one values stored in the leading edge register 152 enable the pattern data bits at the respective AND gates to pass through the one pixel bus 123 to the latches 110, 112, 114, and 116, while the 0 values mask out the respective pattern data bits. Therefore, if the GSP 52 wished to display image that was offset 2 pixels to the right of a respective eight pixel boundary, it would program the leading edge register 152 with value 00111111. This value would mask out the first two pattern data bits from the image on each respective scan line, thereby effectively producing an image two pixels offset from the respective eight pixel boundary.

After the first eight bits of pattern data have passed through the one pixel bus 123 to the output latches 110, 112, 114, and 116, the select logic 160 generates the SEL1 signal to select the one values in the register 158 to be output from the multiplexer 156 and provided to the AND gates 164. The one values provided to the inputs of each of the AND gates 164 enable all of the respective pattern data bits to pass through the one pixel bus unchanged to the latches 110, 112, 114, and 116. The one values in the register 158 are provided through the multiplexer 156 to the AND gates 164 for the remaining pattern data until the very last byte of pattern data for the respective scan line.

When the last eight bits of pattern data are to be output from the multiplexer 122, the select logic 160 generates the SEL1 and SEL2 signals such that the values in the trailing edge register 154 are selected to be output from the multiplexer 156 and provided to the inputs of the AND gates 164. This enables the GSP 52 to mask any of the eight rightmost pixels of an image on each respective scan line. Therefore, the GSP 52 can also adjust the right boundary of an image by an individual number of pixels, instead of having to align the boundary on eight pixel boundaries as was previously the case. As an example, if the GSP 52 wished to display image whose rightmost boundary was 6 pixels to the right of a respective eight pixel boundary, it would program the trailing edge register 152 with value 11111100. This value would preserve the first six pattern data bits in the image on each respective scan line, thereby effectively producing an image with a boundary six pixels to the right of a respective eight pixel boundary.

Therefore, when the GSP 52 is performing a color expand operation using the pixel color processor, it can align or adjust the left and right boundaries of an image by an individual number of pixels. The GSP 52 is thus able to address individual pixels in performing its boundary adjustments.

Therefore, the present invention comprises a pixel color processor which supplements a graphics processor by performing color management duties. The pixel color processor enables the graphics processor to manipulate bits of data which correspond to color pixels or to pixel patterns which in turn correspond to color pixels. Therefore, the pixel color processor reduces the amount of data manipulation required by the graphics processor and allows it to manipulate more pixels per operational cycle. The present invention also includes methods for performing color expand operations using either the color expand features of VRAM 58, or using logic in either the LBC 54 or the pixel color processor to mimic the color expand features of the VRAM 58. The present invention also includes an apparatus which enables a user to align images on individual pixel boundaries when using the source array 102 in the pixel color processor to perform color expand operations.

The foregoing disclosure and description of the invention are illustrative and explanatory thereof, and various changes in the size, shape, materials, components, circuit elements, wiring connections, and contacts, as well as in the details of the illustrated circuitry and construction may be made without departing from the spirit of the invention.

I claim:

1. An apparatus for performing supplemental graphical processing duties in a computer system having a processor that generates addresses and generates and receives data, the apparatus comprising:

video memory which stores pixel data;

monomap memory coupled to the processor having source and destination regions, wherein each monomap address in said source and destination regions maps to a plurality of addresses in said video memory;

source address receiving means coupled between the processor and said monomap memory for receiving source region monomap addresses generated by the processor and translating said received monomap addresses into corresponding source addresses in said video memory;

pixel data storage means coupled to said video memory and said source address receiving means for reading pixel data located at said corresponding source video memory addresses and storing said pixel data after the processor generates said source monomap addresses;

destination receiving means coupled between the processor and said monomap memory for receiving destination region monomap addresses generated by the processor and translating said received destination monomap addresses into corresponding destination addresses in said video memory; and pixel data writing means coupled to said video memory, said pixel data storage means and said destination receiving means for writing said pixel data to said corresponding destination addresses in said video memory after the processor generates said destination monomap addresses.

2. The apparatus of claim 1, wherein said video memory receives a write enable signal which enables said pixel data to be stored in said video memory and wherein the processor provides data when it generates said monomap destination region addresses, the apparatus further comprising:

means coupled to the processor which receives said data generated by the processor for transforming said data into a plurality of write signals for use with said accessed pixel data; and means coupled to said transforming means and to said pixel data writing means for providing said write enable signals to said video memory when said stored pixel data is written to said video memory.

3. The apparatus of claim 2, further comprising:

means coupled to the processor for providing dummy data to the processor when the processor generates said source region monomap addresses;

wherein the processor operates on said dummy data and generates altered dummy data when it generates said monomap destination addresses; and wherein said transforming means receives said altered dummy data and uses said altered dummy data to generate said plurality of write enable signals.

4. The apparatus of claim 1, wherein said pixel data is comprised of a plurality of units; and wherein said pixel data storage means outputs a first number of units of said pixel data; and wherein said pixel data writing means includes:

multiplexing means for receiving said first number of units of said pixel data and for outputting one of said units of said pixel data;

means coupled to said multiplexing means for selecting which of said first number of units received as input is output by said multiplexing means;

latches for receiving said unit of said pixel data output from said multiplexing means and for storing said unit of said pixel data until said first number of said units have been stored; and means coupled to said latches for outputting said first number of units of said pixel data from said latches to said video memory when said first member of said units have been stored.

5. The apparatus of claim 4, wherein said pixel data storage means reads said pixel data using page mode read cycles; and wherein said latches output said first number of units of said pixel data using page mode write cycles.

6. The apparatus of claim 5, wherein said units of said pixel data are output to a video monitor having a plurality of scan lines, wherein said multiplexer selecting means includes:

pixel data output counting means for determining which of said units of said pixel data in said pixel data storage means is to be output from said multiplexer;

counting storing means coupled to said pixel data output counting means for storing an initial value of said counting means for each respective scan line;

destination storing means for storing a destination value representing the number of said units of said pixel data to be transferred to each said respective scan line;

a destination counting means coupled to said destination storing means and said counting storing means for counting the number of said units of said pixel data transferred to each said respective scan line;

wherein said destination counting means counts backward from an initial value to zero and generates a signal when it reaches zero; and means coupled to said pixel data output counting means and said destination counting means which receives said zero indicating a signal for reinitializing said destination counting means to the value in said destination storing means and said stored pixel output counting means to the value in said counting storing means when said destination counting means reaches zero.

7. The apparatus of claim 4, wherein said pixel data storage means include two halves;

wherein one said half of said pixel data storage means receives pixel data located at said corresponding video memory addresses while said other half of said pixel data storage means is outputting said plurality of units of said pixel data.

8. The apparatus of claim 7, wherein said latches include two halves;

wherein one said half of said latches receives units of said pixel data while said other half of said latches is outputting said units of said pixel data to said video memory.

9. The apparatus of claim 4, wherein said pixel data is comprised of pattern data; and wherein said memory includes color expand features which enables said video memory to expand color pixel data onto said pattern data for storage in said video memory.

10. The apparatus of claim 9, wherein each of said monomap memory address locations include a plurality of bits which each correspond to a plurality of address locations in said video memory, each of said video memory address locations referencing pixel data;

wherein said pixel data writing means further includes:

aligning means coupled between said multiplexing means and said latches for aligning said color pixel data output from said multiplexing means on individual pixel boundaries when said pixel data is pixel pattern data.

11. The apparatus of claim 10, wherein said pixel data is output to a video monitor comprising a plurality of scan lines; and wherein said stored pixel data writing means includes a unit pixel bus having a first data width connected between said multiplexing means and said latches which receives one of said units of said pixel data from said multiplexing means and provides said unit of said pixel data to said latches;

wherein said units of said pixel data output from said multiplexing means includes a first unit of said pixel data and a last unit of said pixel data for each said scan line;

wherein said aligning means is coupled to said unit pixel bus between said multiplexing means and said latches and includes:

masking means coupled to said unit pixel bus for masking each bit of said unit of pixel data while said unit of pixel data is on said unit pixel bus;

leading edge storing means for storing a mask value to mask said first unit of said pixel data;

trailing edge storing means for storing a mask value to mask said last unit of said pixel data; and providing means coupled to said leading edge and trailing edge storing means and to said masking means for providing said mask value from said leading edge storing means when said first unit of pixel data is on said unit pixel bus and for providing said mask value from said trailing edge storing means when said last unit of pixel data is on said unit pixel bus.

12. The apparatus of claim 11, where said providing means includes:

a second multiplexing means which receives said mask values from said leading edge and trailing edge storing means and generates an output to said masking means; and selecting means coupled to said second multiplexing means for selecting said mask value from said leading edge storing means when said first unit of pixel data is on said unit pixel bus and for selecting said mask value from said trailing edge storing means when said last unit of pixel data is on said unit pixel bus.

13. The apparatus of claim 12, wherein said providing means further includes:

means coupled to said second multiplexing means for providing one values to an input of said second multiplexing means; and wherein said selecting means selects said one values to be output from said second multiplexing means when said unit of pixel data on said unit pixel bus is other than said first unit of pixel data or said last unit of pixel data.

14. The apparatus of claim 12, wherein said masking means comprises a plurality of AND gates which receive inputs from lines in said unit pixel bus and from said outputs of said multiplexing means and generate outputs to said latching means.

15. The apparatus of claim 4, wherein said pixel data is comprised of pixel pattern data, and wherein said stored pixel data writing means further includes:

means coupled between said multiplexing means and said latching means for expanding pixel color data onto the pixel data when the pixel data is comprised of pixel pattern data.

16. The apparatus of claim 1, wherein said pixel data is comprised of pixel pattern data; and wherein said video memory includes color expand features which enables said video memory to expand color pixel data onto said pattern data and then store said color pixel data in said video memory.

17. The apparatus of claim 1, wherein the processor operates in a number of bit per pixel modes; and wherein the processor enters a one bit per pixel mode before generating said source and destination monomap addresses.

18. A method for transferring pixel data in a computer system having video memory which includes color expand features and a region which stores pattern data, monomap memory comprising a plurality of addresses, wherein each of said monomap addresses map to a plurality of addresses in the video memory, means for determining if a monomap memory address corresponds to video memory addresses in the pattern data region, and a processor that generates addresses and generates and receives data, wherein the processor operates in a number of bit per pixel modes, the method comprising:

the processor entering a one bit per pixel mode;

the processor generating a write cycle including monomap memory addresses and one bit pixel data;

the determining means receiving said monomap addresses generated by the processor and determining if said received monomap addresses correspond to video memory addresses in the pattern data region;

the video memory receiving said one bit pixel data;

the video memory using its color expand features to expand color data onto said one bit pixel data if said monomap addresses correspond to video memory addresses in the pattern data region; and the video memory storing said color data into said corresponding video memory addresses.

19. A method for transferring pixel data in a computer system having video memory, monomap memory comprising a plurality of addresses which each map to a plurality of addresses in the video memory, means for translating monomap memory addresses into video memory addresses, color expand means for expanding color pixel data onto one bit pixel data, and a processor that generates addresses and generates and receives data, wherein the processor operates in a number of bit per pixel modes, the method comprising:

the processor entering a one bit per pixel mode;

the processor generating a write cycle including monomap memory addresses and one bit pixel data;

the translating means receiving said monomap addresses generated by the processor and translating said received monomap addresses into corresponding video memory addresses;

the color expand means expanding color pixel data onto said one bit pixel data; and the video memory receiving said video memory addresses and said color pixel data and storing said color pixel data into said video memory addresses.

* * * * *

UNITED STATES PATENT AND TRADEMARK OFFICE
CERTIFICATE OF CORRECTION

PATENT NO. :    5,251,298
DATED      :    October 5, 1993
INVENTOR(S) :   Robert M. Nally It is certified that error appears in the above-identified patent and that said Letters Patent is hereby corrected as shown below:

In claim 2, column 24, line 67, please replace "write signals" with --write enable signals--.

In claim 6, column 25, line 65, after "indicating" please delete "a".

In claim 9, column 26, line 18, after "wherein said" please insert --video--.

In claim 11, column 26, line 37, after "said" please delete "stored".

Signed and Sealed this

Twenty-ninth Day of March, 1994

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,251,298
DATED : October 5, 1993
INVENTOR(S) : Robert M. Nally

It is certified that error appears in the above-identified patent and that said Letters Patent is hereby corrected as shown below:

Column 25,
Line 32, delete "member" and insert -- number --.

Signed and Sealed this

Twentieth Day of December, 2005

JON W. DUDAS
*Director of the United States Patent and Trademark Office*